United States Patent
Roberts et al.

(10) Patent No.: US 12,449,121 B1
(45) Date of Patent: Oct. 21, 2025

(54) AIR SOURCE HEAT PUMP SYSTEM AND METHOD OF USE FOR INDUSTRIAL STEAM GENERATION

(71) Applicants: COLORADO STATE UNIVERSITY RESEARCH FOUNDATION, Fort Collins, CO (US); ATMOSZERO, INC., Fort Collins, CO (US)

(72) Inventors: Nickolas Roberts, Fort Collins, CO (US); Todd M. Bandhauer, Fort Collins, CO (US); Ashwin Salvi, Fort Collins, CO (US); Addison Stark, Fort Collins, CO (US)

(73) Assignees: Colorado State University Research Foundation, Fort Collins, CO (US); AtmosZero, Inc., Loveland, CO (US)

( * ) Notice: Subject to any disclaimer, the term of this patent is extended or adjusted under 35 U.S.C. 154(b) by 0 days.

(21) Appl. No.: 18/640,484

(22) Filed: Apr. 19, 2024

Related U.S. Application Data

(63) Continuation of application No. 18/324,066, filed on May 25, 2023, which is a continuation of application No. PCT/US2022/072937, filed on Jun. 14, 2022.
(Continued)

(51) Int. Cl.
 *F22B 1/02* (2006.01)
 *F24V 40/00* (2018.01)
 *F25B 7/00* (2006.01)

(52) U.S. Cl.
 CPC .............. *F22B 1/028* (2013.01); *F25B 7/00* (2013.01); *F24V 40/00* (2018.05)

(58) Field of Classification Search
 CPC ........ F25B 7/00; F25B 2400/13; F01K 9/003; F01K 9/04; F24H 4/02; F22B 1/028; F22B 1/16; F24V 40/00
 See application file for complete search history.

(56) References Cited

U.S. PATENT DOCUMENTS 4,028,079 A * 6/1977 Scheibel ................. F25B 7/00
                                                        62/335
4,509,341 A    4/1985 Zimmern
(Continued)

FOREIGN PATENT DOCUMENTS

CN    101326409 A * 12/2008 ............... F25B 7/00
CN    109323234 A    2/2019
(Continued)

OTHER PUBLICATIONS

Arpagaus et al. High temperature heat pumps: Market overview, state of the art, research status, refrigerants, and application potentials. Energy 152 (2018) 985-1010.
(Continued)

*Primary Examiner* — Tavia Sullens

(57) ABSTRACT

A system for generating steam for industrial heat. The system may include a plurality of heat pump cycles in thermal communication with each other and in thermal communication with a steam generation cycle. The plurality of heat pump cycles may include first and second heat pump cycles. The first heat pump circulates a first a working fluid and includes a first heat exchanger. The second heat pump cycle circulates a second working fluid and includes a second heat exchanger. The first heat exchanger transfers heat from the first to the second working fluid. The second heat exchanger transfers heat to a third working fluid in the steam generation cycle.

22 Claims, 12 Drawing Sheets

Related U.S. Application Data

(60) Provisional application No. 63/290,784, filed on Dec. 17, 2021, provisional application No. 63/211,297, filed on Jun. 16, 2021.

(56) References Cited

U.S. PATENT DOCUMENTS

| | | | |
|---|---|---|---|
| 4,594,858 | A | 6/1986 | Shaw |
| 6,474,087 | B1 | 11/2002 | Lifson |
| 11,698,074 | B2 | 7/2023 | Kim et al. |
| 2005/0044885 | A1 | 3/2005 | Pearson |
| 2005/0262859 | A1 | 12/2005 | Crane et al. |
| 2010/0024470 | A1 | 2/2010 | Lifson et al. |
| 2010/0083678 | A1 | 4/2010 | Lifson et al. |
| 2010/0101248 | A1 | 4/2010 | Lifson |
| 2010/0139298 | A1 | 6/2010 | Lifson et al. |
| 2010/0147006 | A1 * | 6/2010 | Taras .................. F25B 7/00 62/335 |
| 2010/0199712 | A1 | 8/2010 | Lifson et al. |
| 2010/0251750 | A1 | 10/2010 | Lifson et al. |
| 2011/0094251 | A1 | 4/2011 | Kim et al. |
| 2011/0110760 | A1 | 5/2011 | Sanchez |
| 2011/0309635 | A1 | 12/2011 | Sardo |
| 2012/0216551 | A1 | 8/2012 | Minor et al. |
| 2013/0274948 | A1 | 10/2013 | Matsuo et al. |
| 2014/0013786 | A1 | 1/2014 | Kanamaru et al. |
| 2015/0128640 | A1 | 5/2015 | Sun et al. |
| 2016/0138837 | A1 | 5/2016 | Gromoll et al. |
| 2017/0146271 | A1 | 5/2017 | Hasegawa et al. |
| 2017/0256949 | A1 | 9/2017 | Stanton |
| 2019/0017730 | A1 | 1/2019 | Matsukura et al. |
| 2019/0375971 | A1 | 12/2019 | Rached |
| 2021/0156597 | A1 | 5/2021 | Bandhauer et al. |
| 2023/0296243 | A1 | 9/2023 | Bandhauer et al. |
| 2024/0125519 | A1 * | 4/2024 | Taras .................. F25B 7/00 |
| 2025/0043996 | A1 * | 2/2025 | Taras .................. F25B 7/00 |

FOREIGN PATENT DOCUMENTS

| | | | | |
|---|---|---|---|---|
| DE | 10224754 | A1 * | 12/2003 | ............. B60H 1/005 |
| EP | 0725255 | A2 | 8/1996 | |
| JP | 2006348876 | A | 12/2006 | |
| JP | 2008232534 | A * | 10/2008 | |
| JP | 2010164258 | A | 7/2010 | |
| JP | 2012017700 | A | 1/2012 | |
| JP | 2012215319 | A | 11/2012 | |
| JP | 2013204878 | A | 10/2013 | |
| JP | 2014062700 | A | 4/2014 | |
| JP | 5740790 | B2 | 7/2015 | |
| KR | 20180067873 | A | 6/2018 | |
| KR | 101878234 | B1 | 7/2018 | |
| KR | 101895383 | B1 | 9/2018 | |
| KR | 101987884 | B1 | 6/2019 | |
| WO | WO-2007029680 | A1 | 3/2007 | |
| WO | WO-2011142414 | A1 | 11/2011 | |
| WO | WO-2013136606 | A1 * | 9/2013 | ............... F25B 7/00 |
| WO | WO-2017195275 | A1 | 11/2017 | |
| WO | WO-2022266622 | A2 | 12/2022 | |
| WO | WO-2024196819 | A2 | 9/2024 | |

OTHER PUBLICATIONS

Arpagaus et al. High-Temperature Heat Pumps for Industrial Applications—New Developments and Products for Supply Temperatures above 100 degrees Celcius. Webinar: 2023 High-Temperature Heat Pumps Update: Feb. 22, 2023. Australian Alliance for Energy Productivity.

Hasanbeigi et al. Electrifying U.S. Industry: a Technology- and Process-Based Approach to Decarbonization. Renewable Thermal Collaborative. Jan. 2021.

I3—Industrial Innovation Initiative. Industrial Innovation Initiative Level-Setting White Paper. Feb. 2021.

Japan Guide, "When to travel". https://japan-guide.com/e/e2273.html. Year: 2023.

PCT/US2022/072937 International Search Report and Written Opinion dated Nov. 15, 2022.

U.S. Appl. No. 18/324,066 Office Action dated Aug. 18, 2023.

U.S. Appl. No. 18/324,066 Office Action dated Jan. 8, 2024.

U.S. Appl. No. 18/324,066 Office Action dated Jun. 11, 2024.

Yan et al. Air-Source Heat Pump for Distributed Steam Generation: a New and Sustainable Solution to Replace Coal-Fired Boilers in China. Advanced Sustainable Systems 2020, 4, 2000118.

Yan et al. Supporting Information: Air-Source Heat Pump for Distributed Steam Generation: a New and Sustainable Solution to Replace Coal-Fired Boilers in China. Advanced Sustainable Systems 2020.

Zuhlsdorf et al. Analysis of technologies and potentials for heat pump-based process heat supply above 150 degrees Celsius. Energy Conversion and Management X 2 (2019) 100011.

PCT/US2024/020302 Invitation to Pay Additional Fees dated Jun. 6, 2024.

EP20220826007.3 Extended European Search Report dated Apr. 14, 2025.

PCT/US2024/020302 International Search Report and Written Opinion dated Aug. 23, 2024.

U.S. Appl. No. 18/324,066 Office Action dated Jan. 10, 2025.

* cited by examiner

AIR SOURCE HEAT PUMP SYSTEM AND METHOD OF USE FOR INDUSTRIAL STEAM GENERATION

CROSS-REFERENCE TO RELATED APPLICATIONS

This application is a continuation of U.S. patent application Ser. No. 18/324,066, filed May 25, 2023, which is a continuation of International Patent Application No. PCT/US2022/072937, filed Jun. 14, 2022, which claims the benefit of U.S. Provisional Application No. 63/211,297, filed Jun. 16, 2021, and U.S. Provisional Application No. 63/290,784, filed Dec. 17, 2021, each of which is hereby incorporated by reference in its entirety into the present application.

BACKGROUND

In the United States, the industrial sector accounts for 22% of greenhouse gas emissions, which equals approximately 1.5 gigatonnes of equivalent carbon dioxide per year (GtCO2e/year). Within the industrial sector, steam production for process heat is one of the largest energy consumers, accounting for almost 4 quads of U.S. primary energy consumption and emitting more than 200 MMtonnes of carbon dioxide (CO2) every year. Most of these emissions are generated from burning of fuels for conventional boilers, cogeneration, and process heating.

Accordingly, there is a need in the art for systems and methods of steam generation for industrial heat that are more efficient and generate less carbon emissions. It is with these thoughts in mind, among others, that the air source heat pump system and method of use for industrial steam generation were developed.

SUMMARY

Aspects of the present disclosure include a system for generating steam. The system may include a first heat pump cycle and a second heat pump cycle. The first heat pump cycle is configured to circulate a first working fluid. The first heat pump cycle may include: a first heat exchanger, a first compressor, a second heat exchanger, and a first expansion valve. The first heat exchanger is in fluid communication with the first expansion valve and configured to receive the first working fluid from the first expansion valve. The first working fluid absorbs heat in the first heat exchanger. The first compressor is in fluid communication with the first heat exchanger and configured to receive the first working fluid from the first exchanger. The first compressor is configured to increase the pressure and temperature of the first working fluid. The second heat exchanger is in fluid communication with the first compressor and configured to receive the first working fluid from the first compressor. The second heat exchanger is configured to reject heat from the first working fluid to a second working fluid of the second heat pump cycle. The first expansion valve is in fluid communication with the second heat exchanger and is configured to receive the first working fluid from the second heat exchanger. The first expansion valve is configured to expand the first working fluid to a lower pressure.

The second heat pump cycle is configured to circulate the second working fluid. The second heat pump cycle may include: the second heat exchanger, a second compressor, a third heat exchanger, and a second expansion valve. The second heat exchanger is in fluid communication with a second expansion valve and is configured to receive the second working fluid from the second expansion valve. The second working fluid absorbs heat from the first working fluid in the second heat exchanger. The second compressor is in fluid communication with the second heat exchanger and is configured to receive the second working fluid from the second heat exchanger. The second compressor is configured to increase the pressure and temperature of the second working fluid. The third heat exchanger is in fluid communication with the second compressor and is configured to receive the second working fluid from the second compressor. The third heat exchanger is in fluid communication with a third working fluid in a steam generation system. The third heat exchanger is configured to reject heat from the second working fluid to the third working fluid in the steam generation system, the third working fluid being water. The second expansion valve is in fluid communication with the third heat exchanger and configured to receive the second working fluid from the third heat exchanger. The second expansion valve is configured to expand the second working fluid to a lower pressure.

In certain instances, the system may further includes: a first suction-line heat exchanger and a second suction-line heat exchanger. The first suction-line heat exchanger is in fluid communication with and between the first heat exchanger and the first compressor. The first suction-line heat exchanger is in fluid communication with and between the second heat exchanger and the first expansion valve. The first suction-line heat exchanger is configured to preheat the first working fluid prior to compressing the first working fluid with the outflow of the first working fluid from the second heat exchanger. The second suction-line heat exchanger is in fluid communication with and is positioned between the second heat exchanger and the second compressor. The second suction-line heat exchanger is in fluid communication with and between the third heat exchanger and the second expansion valve. The second suction-line heat exchanger is configured to preheat the second working fluid prior to compressing the second working fluid with the outflow of the second working fluid from the third heat exchanger.

In certain instances, the first heat exchanger facilitates heat transfer from a first transfer fluid to the first working fluid, the first fluid being air.

In certain instances, the steam generation system may include a steam compressor in fluid communication with the third heat exchanger, the steam compressor configured to increase the pressure and temperature of the third working fluid so as to output steam. In certain instances, the system may further include the steam generation system.

In certain instances, the steam compressor may be configured to deliver steam at temperatures of greater than or equal to 120 degrees Celsius from heat delivered from the first and second heat pump cycles.

In certain instances, the system may further include a control system in electrical communication with the first and second heat pump cycles, the control system configured to control the delivery of heat to the third working fluid from at least one or both of a first heat source, and a second heat source, the first heat source including the first and second heat pump cycles, the second heat source including an alternate heat source.

In certain instances, the first and second compressors are centrifugal. In certain instances, the first and second compressors are electrically powered.

In certain instances, the first working fluid may be one of a fluorocarbon, a hydrofluoroolefin, a hydrofluoroether, a hydrocarbon, carbon dioxide, ammonia, or water, and the second working fluid may be one of a fluorocarbon, a hydrofluoroolefin, a hydrofluoroether, a hydrocarbon, carbon dioxide, ammonia, or water.

Aspects of the present disclosure include a system for generating steam for industrial heat. The system may include a first heat pump cycle and a second heat pump cycle. The first heat pump cycle is configured to circulate a first working fluid. The first heat pump cycle may include: an evaporator, a first compressor, a heat exchanger, and a first expansion valve. The evaporator is in fluid communication with the first expansion valve and configured to receive the first working fluid from the first expansion valve. The first working fluid absorbs heat in the evaporator. The first compressor is in fluid communication with the evaporator and configured to receive the first working fluid from the evaporator. The first compressor is configured to increase the pressure and temperature of the first working fluid. The heat exchanger is in fluid communication with the first compressor and configured to receive the first working fluid from the first compressor. The heat exchanger is configured to reject heat from the first working fluid to a second working fluid of the second heat pump cycle. The first expansion valve is in fluid communication with the heat exchanger and configured to receive the first working fluid from the heat exchanger, the first expansion valve is configured to expand the first working fluid to a lower pressure.

The second heat pump cycle is configured to circulate the second working fluid. The second heat pump cycle may include: the heat exchanger, suction-line heat exchanger, a second compressor, a steam generator, and a second expansion valve. The heat exchanger is in fluid communication with a second expansion valve and configured to receive the second working fluid from the second expansion valve. The second working fluid absorbs heat from the first working fluid in the heat exchanger. The suction-line heat exchanger is in fluid communication with the heat exchanger and configured to receive the second working fluid from the heat exchanger. The suction-line heat exchanger is configured to preheat the second working fluid prior to compressing the second working fluid. The second compressor is in fluid communication with the suction-line heat exchanger and configured to receive the second working fluid from the suction-line heat exchanger. The second compressor is configured to increase the pressure and temperature of the second working fluid. The steam generator is in fluid communication with the second compressor and configured to receive the second working fluid from the second compressor. The steam generator is configured to reject heat from the second working fluid to a transfer fluid. The suction-line heat exchanger is in fluid communication with the steam generator. The second expansion valve is in fluid communication with the suction-line heat exchanger and configured to receive the second working fluid from the suction-line heat exchanger. The second expansion valve is configured to expand the second working fluid to a lower pressure.

In certain instances, the system may further include: a third compressor and a fourth compressor. The third compressor is in the first heat pump cycle. The third compressor is in fluid communication with and positioned between the first compressor and the heat exchanger. The third compressor is configured to receive the first working fluid from the first compressor. The third compressor is configured to increase the pressure and temperature of the first working fluid. The fourth compressor is in the second heat pump cycle. The fourth compressor is in fluid communication with the second compressor and configured to receive the second-working fluid from the second compressor. The fourth compressor is configured to increase the pressure and temperature of the second working fluid.

In certain instances, the first compressor and third compressor are rotatably coupled together on a shaft and electrically powered by a motor. In certain instances, the second compressor may be electrically powered by a first motor and the fourth compressor may be electrically powered by a second motor.

In certain instances, the first heat pump cycle includes a first economizer and a third expansion valve, the first economizer configured to receive a primary fluid stream of the first working fluid from the heat exchanger and reject heat therefrom in the first economizer, the third expansion valve configured to receive a secondary fluid stream of the first working fluid from the heat exchanger and expand the secondary fluid stream of the first working fluid to a lower pressure prior to entering the first economizer, and the secondary fluid stream of the first working fluid configured to absorb heat in the first economizer, wherein the secondary fluid stream of the first working fluid may be directed to an inflow of the third compressor, and wherein the primary fluid stream of the first working fluid may be directed to an inflow of the first expansion valve.

In certain instances, the first compressor is configured to receive the primary fluid stream of the first working fluid, and the second compressor may be configured to receive the primary and secondary fluid streams of the first working fluid.

In certain instances, the second heat pump cycle includes a second economizer and a fourth expansion valve, the second economizer configured to receive a primary fluid stream of the second working fluid from the steam generator and reject heat therefrom in the second economizer, the fourth expansion valve configured to receive a secondary fluid stream of the second working fluid from the steam generator and expand the secondary fluid stream of the second working fluid to a lower pressure prior to entering the second economizer, and the secondary fluid stream of the second working fluid configured to absorb heat in the second economizer, wherein the secondary fluid stream of the second working fluid may be directed to an inflow of the fourth compressor, and wherein the primary fluid stream of the second working fluid may be directed to the suction-line heat exchanger to preheat the second working fluid exiting the heat exchanger.

In certain instances, the third compressor may be configured to receive the primary fluid stream of the second working fluid and the fourth compressor may be configured to receive the primary and secondary fluid streams of the second working fluid.

In certain instances, the steam generator may be configured to deliver steam at temperatures of greater than or equal to 150 degrees Celsius.

In certain instances, the evaporator may be configured to receive a first transfer fluid, the evaporator configured to reject heat from the first transfer fluid, wherein the first transfer fluid may be air.

Aspects of the present disclosure include a method for generating steam for industrial heat. The method may include: rejecting heat from a first circulating fluid to a first working fluid in a first heat exchanger; preheating the first working fluid in a first suction-line heat exchanger prior to compressing the first working fluid; compressing the first working fluid via a first compressor, thereby increasing the pressure of the first working fluid; rejecting heat from the first working fluid to a second working fluid in a second heat exchanger; expanding the first working fluid to a lower pressure via a first expansion valve; preheating the second working fluid in a second suction-line heat exchanger prior to compressing the second working fluid; compressing the second working fluid via a second compressor, thereby increasing the pressure of the second working fluid; rejecting heat from the second working fluid to a third working in a third heat exchanger, the third working fluid being part of a steam generation system; and expanding the second working fluid to a lower pressure via a second expansion valve.

In certain instances, the steam generation system includes a steam compressor configured to generate steam from the third working fluid. In certain instances, the steam compressor may be configured to deliver steam at temperatures of greater than or equal to 120 degrees Celsius. In certain instances, the first and second compressors are centrifugal compressors. In certain instances, the first and second compressors are electrically powered.

Aspects of the present disclosure include a method for generating steam for industrial heat. The method may include: absorbing heat in a first working fluid in an evaporator, the first working fluid circulating in a first heat pump cycle; compressing the first working fluid in a first compressor, thereby increasing the pressure of the first working fluid; compressing the first working fluid in a second compressor, thereby increasing the pressure of the first working fluid; rejecting heat from the first working fluid to a second working fluid in a heat exchanger, the second working fluid circulating in a second heat pump cycle; expanding the first working fluid to a lower pressure via a first expansion valve; preheating the second working fluid in a suction-line heat exchanger prior to compressing the second working fluid in a third compressor; compressing the second working fluid in the third compressor, thereby increasing the pressure of the second working fluid; compressing the second working fluid in a fourth compressor, thereby increasing the pressure of the second working fluid; rejecting heat from the second working fluid in a steam generator; rejecting heat from the second working fluid in the suction-line heat exchanger after exiting the steam generator; and expanding the second working fluid to a lower pressure via a second expansion valve.

In certain instances, the system may further include splitting the first working fluid into a primary fluid stream and a secondary fluid stream; expanding the secondary fluid stream of the first working fluid to a lower pressure via a third expansion valve; absorbing heat in the secondary fluid stream of the first working fluid in a first economizer; and rejecting heat from the primary fluid stream of the first working fluid to the secondary fluid stream of the first working fluid in the first economizer.

In certain instances, the system further may include directing the primary fluid stream of the first working fluid to the first expansion valve; and directing the secondary fluid stream of the first working fluid to an inflow of the second compressor.

In certain instances, the first and second compressors are rotatably coupled together via a shaft and are powered by a motor.

In certain instances, heat may be absorbed in the evaporator from ambient air, and the steam generator may be configured to deliver steam at 150 degrees Celsius or greater.

Aspects of the present disclosure include a system for generating steam for industrial heat. The system may include a plurality of heat pump cycles in thermal communication with each other and in thermal communication with a steam generation cycle. The plurality of heat pump cycles may include a first heat pump cycle and a second heat pump cycle. The first heat pump is configured to circulate a first working fluid and includes a first heat exchanger and a first suction-line heat exchanger. The second heat pump cycle is configured to circulate a second working fluid and includes a second heat exchanger and a second suction-line heat exchanger. The first suction-line heat exchanger is configured to preheat the first working fluid prior to compressing the first working fluid. The first heat exchanger is configured to transfer heat from the first working fluid to the second working fluid. The second suction-line heat exchanger is configured to preheat the second working fluid prior to compressing the second working fluid. The second heat exchanger is configured to transfer heat from the second working fluid a third working fluid in the steam generation cycle.

Aspects of the present disclosure include an energy arbitrage system including a cascading heat pump system that generates steam. The energy arbitrage system further includes a computing device in communication with the cascading heat pump system for generating steam and with a boiler configured to generate steam. The computing device includes a processing device and a computer-readable medium with one or more executable instructions stored thereon, wherein the processing device of the computing device executes the one or more instructions to perform the operations of: receive steam demands from a facility; sends instructions to the cascading heat pump system for generating steam to provide for the steam demands from the facility; and sends instructions to the boiler to provide for a remaining portion of the steam demands from the facility if the cascading heat pump system for generating steam cannot fulfill all of the steam demands.

In certain instances, the computing device is in further communication with a renewable energy source configured to provide electricity to the electric grid and to the cascading heat pump system. The processing device of the computing device executes the one or more instructions to perform the further operations of: receiving information associated with an amount of electricity produced by the renewable energy source; sending instructions to the renewable energy source to supply electricity to the system for generating steam; sending instructions to the renewable energy source to supply excess electricity that is not required by the cascading heat pump system for generating steam to the electric grid; and sending instructions to the cascading heat pump system for generating steam to draw electricity from the electric grid if the renewable energy source supplies an insufficient amount of electricity.

Aspects of the present disclosure include an energy arbitrage system including a cascading heat pump system that generates steam. The energy arbitrage system further includes a computing device in communication with the cascading heat pump system for generating steam and with a renewable energy source configured to provide electricity to the electric grid and to the system for generating steam. The computing device includes a processing device and a computer-readable medium with one or more executable instructions stored thereon, wherein the processing device of the computing device executes the one or more instructions to perform the operations of: receiving information associated with an amount of electricity produced by the renewable energy source; sending instructions to the renewable energy source to supply electricity to the system for generating steam; sending instructions to the renewable energy source to supply excess electricity that is not required by the cascading heat pump system for generating steam to the electric grid; and sending instructions to the cascading heat pump system for generating steam to draw electricity from the electric grid if the renewable energy source supplies an insufficient amount of electricity.

Aspects of the present disclosure include an energy arbitrage system including a cascading heat pump system that generates steam. The energy arbitrage system further includes a computing device in communication with: the system for generating steam; a thermal storage unit configured to deliver steam; and a renewable energy source configured to provide electricity to the thermal storage unit and to the system for generating steam. The computing device includes a processing device and a computer-readable medium with one or more executable instructions stored thereon, wherein the processing device of the computing device executes the one or more instructions to perform the operations of: receiving information associated with an amount of electricity produced by the renewable energy source; sending instructions to the renewable energy source to supply electricity to the system for generating steam; and sending instructions to the renewable energy source to supply excess electricity that is not required by the cascading heat pump system for generating steam to the thermal storage unit.

In certain instances, the processing device of the computing device executes the one or more instructions to perform the further operations of: when the amount of electricity produced by the renewable energy source is insufficient to operate the system for generating steam, sending instructions to the thermal storage units to supply steam to the facility.

DETAILED DESCRIPTION

Figure 1:
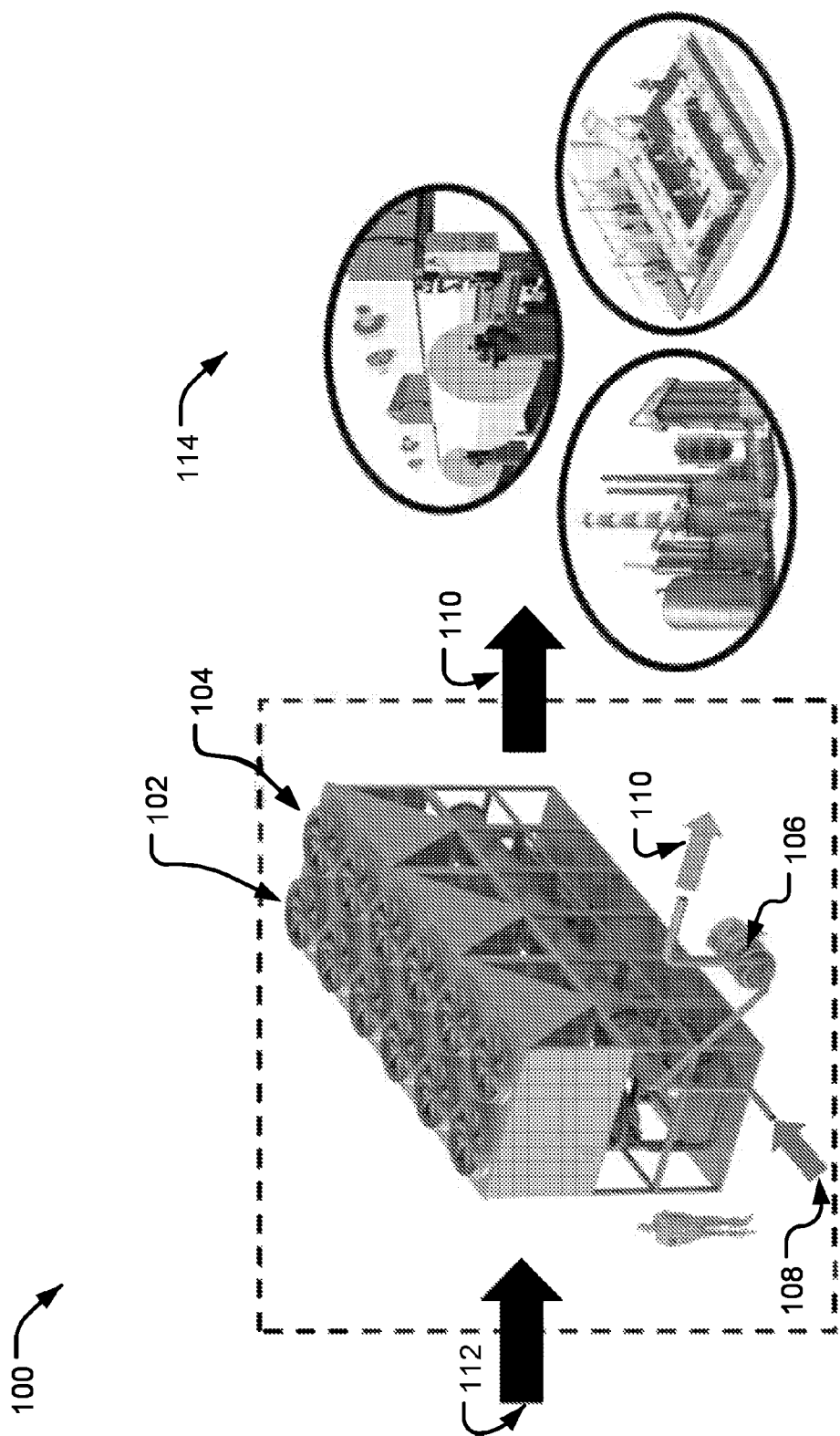
FIG. 1 is a diagram of a modular, electric-powered, cascading, air-source heat pump system in use with a steam compressor for use in industrial applications.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. As such, elements of one system can be incorporated into any of the systems described herein. And, elements can be subtracted from any of the systems described herein without limitation.

Several definitions that apply throughout this disclosure will now be presented.

The term "conduit" is defined as a tube, pipe, or channel to convey, channel, or otherwise flow fluid. The conduit may be a system conduit or may connect two elements within the system, thereby establishing fluid communication between the two elements.

The term "coupled" is defined as connected, whether directly, or indirectly, through intervening components, and is not necessarily limited to physical connections. The connection can be such that the objects are permanently or releasably connected.

FIG. 1 illustrates an exemplary steam generation system 100 in an industrial application. A specific example of the components of such a system will be shown and described in more detail in reference to FIG. 3. FIG. 1 provides an overview of the system 100, which includes a two-stage air-source heat pump comprising a bottoming heat pump 102 (i.e., a first heat pump) and a topping heat pump 104 (i.e., a second heat pump) that are thermally coupled together by an intermediate heat exchanger (i.e., a heat exchanger). The steam generation system 100 may also include a steam compressor 106. In the intermediate heat exchanger, the working fluid in the bottoming heat pump 102 rejects heat to the working fluid in the topping heat pump 104. Then, in a steam generator (i.e., a heat exchanger) the working fluid of the topping heat pump 104 rejects heat to a third working fluid 108. In some instances, the third working fluid 108 may pass through a steam compressor 106 after absorbing heat from steam generator.

Each of the heat pumps 102, 104 are used to "pump" lower temperature heat to a higher temperature by using an electrical energy source. Currently available heat pumps either do not generate a large enough temperature lift to produce steam or they require the use of a higher temperature waste heat stream as the energy source. As described herein, the system 100 utilizes a "cascading" or series of heat pump cycles in thermal connection with each other that progressively raise the temperatures to deliver decarbonized steam at a lower cost than alternative sources. The system 100 does not require waste heat to deliver high temperature steam.

The steam generation system 100 of FIG. 1 may be generally applicable to a variety of industrial processes and/or manufacturing environments. For example, the steam generation system 100 may be used to generate industrial steam. In one instance, the bottoming heat pump 102 and the topping heat pump 104 may be modular, electric-powered air-source heat pumps arranged in a thermally cascading manner. This modularity may enable industry-specific needs, such as different steam pressures and capacities. While the systems in this application illustrate two heat pump cycles (i.e., topping heat pump and bottoming heat pump), the system is scalable and can be modified to include additional heat pumps. In certain instances, the system may include three heat pump cycles. In certain instances, the system may include four heat pump cycles. In certain instances, the system may include five heat pump cycles. In one instance, the steam generation system 100 may generate steam at a temperature of approximately 150-degrees Celsius and at a pressure of approximately 4.5 bar, which may satisfy a majority of industrial steam production needs including the food, paper, and chemical industries.

In the steam generation system 100 of FIG. 1, the bottoming heat pump 102 may utilize ambient air as a heat source (i.e., air sourced). The evaporator (i.e., heat exchanger) of the bottoming heat pump 102 captures heat from the ambient air. The heat is absorbed by the evaporator of the bottoming heat pump 102, thereby evaporating the working fluid within the bottoming heat pump 102.

The topping heat pump 104 is thermally coupled to the bottoming heat pump 102 by an intermediate heat exchanger. In one instance, the intermediate heat exchanger comprises the condenser of the bottoming heat pump 102 and the evaporator of the topping heat pump 104. Thus, within the intermediate heat exchanger, the condenser of the bottoming heat pump 102 rejects heat and the evaporator of the topping heat pump 104 absorbs heat.

The conduit (i.e., fluid flow path) for a third working fluid 108 is coupled to the topping heat pump 104 by a steam generator (i.e., heat exchanger). In one instance, the steam generator comprises the condenser of the topping heat pump 104 and the conduit for a third working fluid 108. Thus, within the steam generator, the condenser of the topping heat pump 104 rejects heat and the third working fluid 108 absorbs heat.

Before entering the steam generator, a mechanical pump may be used to increase the pressure of the third working fluid 108. After the third working fluid 108 exits the steam generator, a steam compressor 106 may be used to increase the pressure and the temperature of the third working fluid 108. Thus, a mechanical pump may be installed before the steam generator, a steam compressor 106 may be installed after the steam generator, or both.

In one instance, the third working fluid 108 is water. Within the steam generator, the water absorbs heat from the working fluid of the topping heat pump 104. In one example, the pressure of the water may be greater than or equal to the target steam saturation temperature. In other words, the water may absorb sufficient heat from the topping heat pump 104 to evaporate into steam 110. After the steam generator, a steam compressor 106 may be used to directly increase the pressure and temperature of the steam 110. In one example, the pressure of the water may be less than the target steam saturation temperature after exiting the steam generator and, therefore, the steam compressor 106 may be used to increase the pressure of the water to the required saturation temperature. The system 100 may be retrofitted to existing steam generation systems within facilities. Alternatively, the system 100 may include a steam generation system as part of the overall system 100.

The steam generation system 100 may be powered by electricity 112. In other words, electricity 112 is input into the steam generation system 100 in order to generate steam 110. For example, the steam generation system 100 may be powered through grid electricity, onsite renewable energy, or a combination thereof. The steam generation system 100 may enable economic decarbonization of industrial steam production, as steam energy in the industrial sector 114 accounts for almost 4 quads of U.S. primary energy consumption and emits more than 200 MMtonnes of $CO_2$ every year.

In some instances, the steam generation system 100 may incorporate energy arbitrage. In other words, energy arbitrage may be used in conjunction with the steam generation system 100 by incorporating additional systems that can provide heating to the steam generation system 100 and/or provide electricity to the heat pump systems described herein. The additional systems could include solar arrays, thermal storage systems, and fuel boilers (e.g., natural gas, coal, waste products, or biomass), among other systems. These systems can be coupled to the steam generation system 100 and/or the heat pump systems and selectively actuated to provide heat to the system 100 and/or electricity to the heat pump systems. The specific system that provides heat to the steam generation system 100 and/or electricity to the heat pump systems can be determined by the availability, the price of the energy source of the system applying heat or electricity, as well as other factors including the requirements of the steam generation system 100. By incorporating energy arbitrage, the steam generation system 100 is capable of generating consistent steam delivery while significantly reducing carbon emissions.

In some instances, the steam generation system 100 may include more than two heat pumps arranged in a thermal cascading manner to heat pump air to generate steam. In one instance, the steam generation system 100 may include three heat pumps. For example, the steam generation system 100 may include a bottoming heat pump (i.e., a first heat pump), an intermediate heat pump (i.e., a second heat pump), and a topping heat pump (i.e., a third heat pump). In another instance, the steam generation system 100 may include four heat pumps. For example, the steam generation system 100 may include a bottoming heat pump (i.e., a first heat pump), a first intermediate heat pump (i.e., a second heat pump), a second intermediate heat pump (i.e., a third heat pump), and a topping heat pump (i.e., a fourth heat pump). In another instance, the steam generation system 100 may include five heat pumps.

In one instance, the bottoming heat pump 102 is coupled to the ambient air (i.e., air sourced). However, in other instances, the bottoming heat pump 102 may be coupled to another low temperature heat source. For example, the low temperature heat source could be a liquid loop that rejects heat to the air, the ground, or another co-located cooling load. In one example, the liquid loop may contain water.

Figure 2:
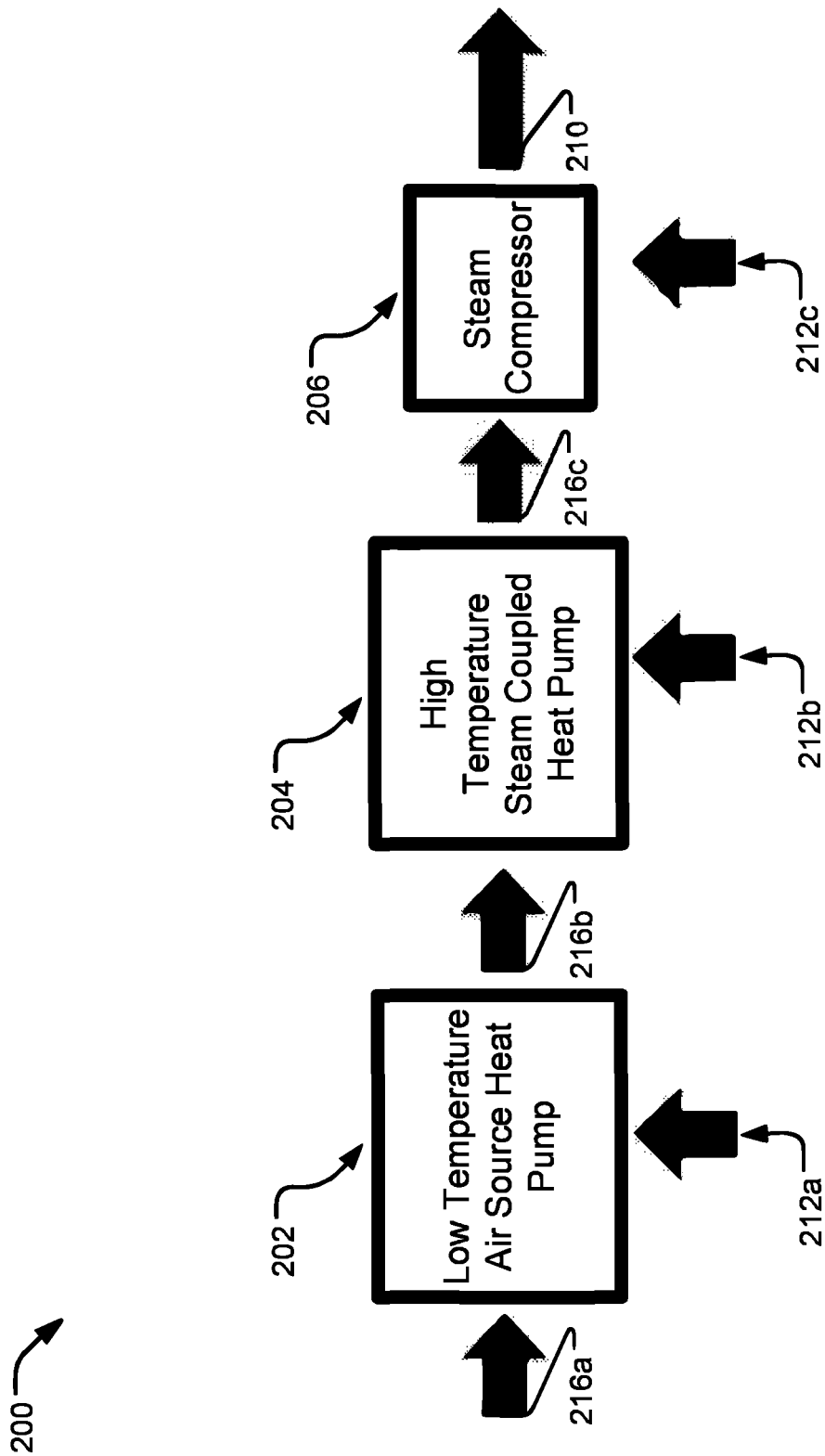
FIG. 2 is a diagram of the cascading heat pump system, comprising a low temperature air source heat pump, a high temperature steam coupled heat pump, and a steam compressor.

FIG. 2 illustrates a partial diagram of a steam generation system 200, which is a partial embodiment of the steam generation system 100 illustrated in FIG. 1. The steam generation system 200 includes a bottoming heat pump 202 (i.e., a first heat pump) and a topping heat pump 204 (i.e., a second heat pump) arranged in a thermally cascading manner. The bottoming heat pump 202 may be a low temperature air source heat pump, and the topping heat pump 204 may be a high temperature steam coupled heat pump. The steam generation system 200 may also include a steam compressor 206.

The steam generation system 200 may include cascading heat pumps that incorporate high-efficiency components to achieve a coefficient of performance greater than two without using waste heat. For example, high-efficiency components may include high-efficiency refrigerant compressors and motors. In one instance, the compressors may be equal to or greater than 85% efficient, and the motors may be equal to or greater than 93% efficient.

For example, a 1 thermal megawatt (MWth) steam generation system 200 may produce 150-degree Celsius steam at a nominal ambient temperature of 20-degrees Celsius. In other words, the steam generation system 200 may provide a temperature lift from 20-degrees Celsius to 150-degrees Celsius at a coefficient of performance greater than two without requiring waste heat.

Heat transfer 216a involves the bottoming heat pump 202 capturing heat from the ambient air by evaporating a working fluid, which may be a refrigerant. In one instance, the ambient air may be approximately 20-degrees Celsius, and the working fluid may be evaporated at 0-degrees Celsius. Electricity 212a may be applied to the bottoming heat pump 202, which may include a 144 kilowatt-electric (kWe) high efficiency compressor and motor. In one instance, the compressor may operate at approximately 85% efficiency and the motor may operate at approximately 93% efficiency.

Heat transfer 216b involves the condenser from the bottoming heat pump 202 rejecting heat to the evaporator in the topping heat pump 204, thereby evaporating the working fluid in the topping heat pump 204. The working fluid in the topping heat pump 204 may be a refrigerant. In one instance, the working fluid in the topping heat pump 204 may be evaporated at 50-degrees Celsius. Electricity 212b may be applied to the topping heat pump 204, which may include a 170 kWe high efficiency compressor and motor. In one instance, the compressor may operate at approximately 85% efficiency and the motor may operate at approximately 93% efficiency.

Heat transfer 216c involves the condenser from the topping heat pump 204 rejecting heat to an evaporating water stream. Within the evaporating water stream, electricity 212c may be applied to a steam compressor 206, which may consume an additional 122 kWe. Thus, 1 MWth of steam 210 is delivered at a 150-degrees Celsius saturation temperature.

In colder environments, the steam generation system 200 coefficient of performance may decrease due to the higher-pressure lift required by the refrigerant compressors. However, the steam generation system 200 may achieve high performance even in cold environments through the system design and high efficiency compressors. The steam generation system 200 may use two different working fluids, for the topping and bottoming cycles, and a final stage steam compressor. In one instance, reductions in auxiliary load, increases in motor efficiency, and improved air coupled heat exchangers may be optimized to decrease the refrigerant to ambient air temperature difference. For example, increasing compressor efficiency to 90%, decreasing the evaporator to air temperature difference from 20-degrees Celsius to 8.5-degrees Celsius, and increasing the motor efficiency to 96% allow the steam generation system 200 to maintain a coefficient of performance greater than two when the ambient air is less than minus 6.5-degrees Celsius.

Figure 3:
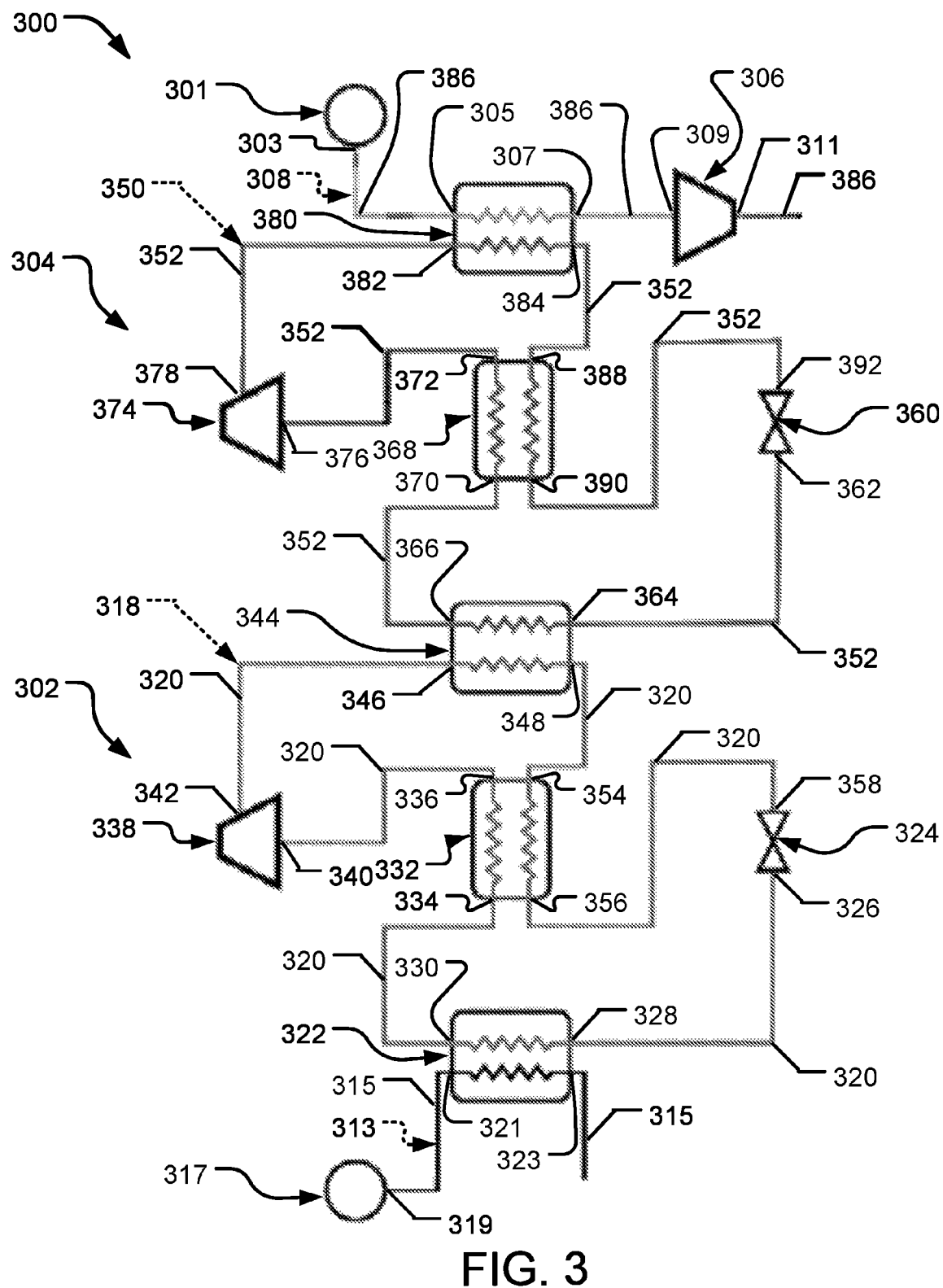
FIG. 3 is a diagrammatic view of a steam generation system comprising a bottoming heat pump cycle, a topping heat pump cycle, and a steam compressor.

FIG. 3 illustrates a steam generation system 300 including many of the elements described in reference to FIGS. 1 and 2. FIG. 3 is a diagrammatic view of the steam generation system 300, which includes a first heat pump cycle 302 (i.e., a bottoming heat pump cycle) and a second heat pump cycle 304 (i.e., a topping heat pump cycle) in thermal communication with each other. The steam generation system 300 is in thermal communication with the second heat pump cycle 304 and may also include a steam compressor 306.

The first heat pump cycle 302 circulates a first working fluid 318 via a conduit 320 of the first heat pump cycle 302, as illustrated in FIG. 3. In one instance, the first working fluid 318 may be a fluorocarbon. As nonlimiting examples, the fluorocarbon may be R1234ze(z) or R1234ze(E). In one instance, the first working fluid 318 may be a hydrofluoroolefin. As a nonlimiting example, the hydrofluoroolefin may be R514a. In one instance, the first working fluid 318 may be a hydrofluoroether. In one instance, the first working fluid 318 may be a hydrocarbon. In one instance, the first working fluid 318 may be carbon dioxide. In one instance, the first working fluid 318 may be ammonia. In one instance, the first working fluid 318 may be water. In one instance, the first working fluid 318 may be an engineered fluid. As a nonlimiting example, the engineered fluid may be Novec 649.

In the first heat pump cycle 302, a heat exchanger 322 receives the first working fluid 318 from an expansion valve 324. In other words, the first working fluid 318 exits the expansion valve 324 at the expansion valve outlet 326 and enters the heat exchanger 322 at the heat exchanger inlet 328. A conduit 320 connects the expansion valve outlet 326 to the heat exchanger inlet 328, thereby establishing fluid communication between the expansion valve 324 and the heat exchanger 322. In the heat exchanger 322, the first working fluid 318 absorbs heat. This heat absorption may vaporize the first working fluid 318, whereby the first working fluid 318 is a low-pressure vapor when it exits the heat exchanger 322 at the heat exchanger outlet 330. In one instance, the heat exchanger 322 may include the evaporator of the first heat pump cycle 302, whereby the evaporator absorbs heat and the first working fluid 318 is evaporated within the evaporator. In one instance, the heat exchanger 322 may be a low-temperature evaporator.

In one instance, a suction-line heat exchanger ("SLHX") 332 may be incorporated into the first heat pump cycle 302. The SLHX 332 receives the first working fluid 318 from the heat exchanger 322 in a first passage of the SLHX 332. In other words, the first working fluid 318 exits the heat exchanger 322 at the heat exchanger outlet 330 and enters the SLHX 332 at the SLHX inlet 334. A conduit 320 connects the heat exchanger outlet 330 to the SLHX inlet 334, thereby establishing fluid communication between the heat exchanger 322 and the SLHX 332. In the first passage of the SLHX 332, the first working fluid 318 absorbs heat, thereby further heating (i.e., preheating) the first working fluid 318 before it exits the SLHX 332 at the SLHX outlet 336.

In other instances, the first heat pump cycle 302 does not include the SLHX 332. In other words, the first working fluid 318 exits the heat exchanger 322 at the heat exchanger outlet 330 and enters the compressor 338 at the compressor inlet 340. A conduit 320 connects the heat exchanger outlet 330 to the compressor inlet 340, thereby establishing fluid communication between the heat exchanger 322 and the compressor 338.

A compressor 338 receives the first working fluid 318 from the SLHX 332. In other words, the first working fluid 318 exits the SLHX 332 at the SLHX outlet 336 and enters the compressor 338 at the compressor inlet 340. A conduit 320 connects the SLHX outlet 336 to the compressor inlet 340, thereby establishing fluid communication between the SLHX 332 and the compressor 338. In the compressor 338, the first working fluid 318 is compressed to a higher pressure, which increases the temperature, before the first working fluid 318 exits the compressor 338 at the compressor outlet 342. In one instance, the compressor 338 is a high-efficiency compressor. In one instance, the compressor 338 may be a centrifugal compressor. In one instance, the compressor 338 may be a two-stage centrifugal compressor. In one instance, the compressor 338 may be electrically powered. In one instance, a high-speed and/or high-efficiency motor may drive the compressor 338.

A heat exchanger 344 (i.e., the intermediate heat exchanger) thermally couples the first heat pump cycle 302 with the second heat pump cycle 304. The heat exchanger 344 receives the first working fluid 318 from the compressor 338. In other words, the first working fluid 318 exits the compressor 338 at the compressor outlet 342 and enters the heat exchanger 344 at the heat exchanger inlet 346. A conduit 320 connects the compressor outlet 342 to the heat exchanger inlet 346, thereby establishing fluid communication between the compressor 338 and the heat exchanger 344. In the heat exchanger 344, the first working fluid 318 rejects heat. This heat rejection may condense the first working fluid 318 before it exits the heat exchanger 344 at the heat exchanger outlet 348. In one instance, the heat exchanger 344 comprises the condenser of the first heat pump cycle 302 and the evaporator of the second heat pump cycle 304. Thus, within the heat exchanger 344, the condenser of the first heat pump cycle 302 rejects heat and the evaporator of the second heat pump cycle 304 absorbs heat. In the heat exchanger 344, the second working fluid 350, which circulates within a conduit 352 within the second heat pump cycle 304, absorbs heat. This heat absorption may vaporize the second working fluid 350, whereby the second working fluid 350 is a low-pressure vapor when it exits the heat exchanger 344.

In one instance, when the SLHX 332 is incorporated into the first heat pump cycle 302, the SLHX 332 receives the first working fluid 318 from the heat exchanger 344 in a second passage of the SLHX 332. In other words, the first working fluid 318 exits the heat exchanger 344 at the heat exchanger outlet 348 and enters the SLHX 332 at the SLHX inlet 354. A conduit 320 connects the heat exchanger outlet 348 to the SLHX inlet 354, thereby establishing fluid communication between the heat exchanger 344 and the SLHX 332. In the second passage of the SLHX 332, the first working fluid 318 rejects heat, thereby cooling (i.e., pre-cooling) the first working fluid 318 before it exits the SLHX 332 at the SLHX outlet 356.

In other instances, the first heat pump cycle 302 does not include the SLHX 332. In other words, the first working fluid 318 exits the heat exchanger 344 at the heat exchanger outlet 348 and enters the expansion valve 324 at the expansion valve inlet 358. A conduit 320 connects the heat exchanger outlet 348 to the expansion valve inlet 358, thereby establishing fluid communication between the heat exchanger 344 and the expansion valve 324.

An expansion valve 324 receives the first working fluid 318 from the SLHX 332. In other words, the first working fluid 318 exits the SLHX 332 at the SLHX outlet 356 and enters the expansion valve 324 at the expansion valve inlet 358. A conduit 320 connects the SLHX outlet 356 to the expansion valve inlet 358, thereby establishing fluid communication between the SLHX 332 and the expansion valve 324. In the expansion valve 324, the first working fluid 318 is expanded to a lower pressure, which decreases the temperature, before the first working fluid 318 exits the expansion valve 324 at the expansion valve outlet 326.

The second heat pump cycle 304 circulates a second working fluid 350, as illustrated in FIG. 3. In one instance, the second working fluid 350 may be a fluorocarbon. As nonlimiting examples, the fluorocarbon may be R1234ze(z) or R1234ze(E). In one instance, the second working fluid 350 may be a hydrofluoroolefin. As a nonlimiting example, the hydrofluoroolefin may be R514a. In one instance, the second working fluid 350 may be a hydrofluoroether. In one instance, the second working fluid 350 may be a hydrocarbon. In one instance, the second working fluid 350 may be carbon dioxide. In one instance, the second working fluid 350 may be ammonia. In one instance, the second working fluid 350 may be water. In one instance, the second working fluid 350 may be an engineered fluid. As a nonlimiting example, the engineered fluid may be Novec 649.

In one instance, the same fluid may be used for both the first working fluid 318 and the second working fluid 350. In other instances, a different fluid may be used for the first working fluid 318 and the second working fluid 350.

In one instance, the second heat pump cycle 304 may contain the same components as the first heat pump cycle 302. The components of the second heat pump cycle 304 may be arranged in the same configuration as the components of the first heat pump cycle 302. The components of the second heat pump cycle 304 may be arranged in a different configuration than the components of the first heat pump cycle 302. In other instances, the second heat pump cycle 304 may contain different components than the first heat pump cycle 302.

In the second heat pump cycle 304, a heat exchanger 344 receives the second working fluid 350 from an expansion valve 360. In other words, the second working fluid 350 exits the expansion valve 360 at the expansion valve outlet 362 and enters the heat exchanger 344 at the heat exchanger inlet 364. A conduit 352 connects the expansion valve outlet 362 to the heat exchanger inlet 364, thereby establishing fluid communication between the expansion valve 360 and the heat exchanger 344. In the heat exchanger 344, the second working fluid 350 absorbs heat. This heat absorption may vaporize the second working fluid 350, whereby the second working fluid 350 is a low-pressure vapor when it exits the heat exchanger 344 at the heat exchanger outlet 366. In one instance, the heat exchanger 344 comprises the condenser of the first heat pump cycle 302 and the evaporator of the second heat pump cycle 304. Thus, within the heat exchanger 344, the condenser of the first heat pump cycle 302 rejects heat and the evaporator of the second heat pump cycle 304 absorbs heat.

In one instance, a suction-line heat exchanger ("SLHX") 368 may be incorporated into the second heat pump cycle 304. The SLHX 368 receives the second working fluid 350 from the heat exchanger 344 in a first passage of the SLHX 368. In other words, the second working fluid 350 exits the heat exchanger 344 at the heat exchanger outlet 366 and enters the SLHX 368 at the SLHX inlet 370. A conduit 352 connects the heat exchanger outlet 366 to the SLHX inlet 370, thereby establishing fluid communication between the heat exchanger 344 and the SLHX 368. In the first passage of the SLHX 368, the second working fluid 350 absorbs heat, thereby further heating (i.e., preheating) the second working fluid 350 before it exits the SLHX 368 at the SLHX outlet 372.

In other instances, the second heat pump cycle 304 does not include the SLHX 368. In other words, the second working fluid 350 exits the heat exchanger 344 at the heat exchanger outlet 366 and enters the compressor 374 at the compressor inlet 376. A conduit 352 connects the heat exchanger outlet 366 to the compressor inlet 376, thereby establishing fluid communication between the heat exchanger 344 and the compressor 374.

A compressor 374 receives the second working fluid 350 from the SLHX 368. In other words, the second working fluid 350 exits the SLHX 368 at the SLHX outlet 372 and enters the compressor 374 at the compressor inlet 376. A conduit 352 connects the SLHX outlet 372 to the compressor inlet 376, thereby establishing fluid communication between the SLHX 368 and the compressor 374. In the compressor 374, the second working fluid 350 is compressed to a higher pressure, which increases the temperature, before the second working fluid 350 exits the compressor 374 at the compressor outlet 378. In one instance, the compressor 374 is a high-efficiency compressor. In one instance, the compressor 374 may be a centrifugal compressor. In one instance, the compressor 374 may be electrically powered. In one instance, a high-speed and/or high-efficiency motor may drive the compressor 374.

A heat exchanger 380 thermally couples the second heat pump cycle 304 with the system of the third working fluid 308. The heat exchanger 380 receives the second working fluid 350 from the compressor 374. In other words, the second working fluid 350 exits the compressor 374 at the compressor outlet 378 and enters the heat exchanger 380 at the heat exchanger inlet 382. A conduit 352 connects the compressor outlet 378 to the heat exchanger inlet 382, thereby establishing fluid communication between the compressor 374 and the heat exchanger 380. In the heat exchanger 380, the second working fluid 350 rejects heat. This heat rejection may condense the second working fluid 350 before it exits the heat exchanger 380 at the heat exchanger outlet 384. In one instance, the heat exchanger 380 may include the condenser of the second heat pump cycle 304, whereby the condenser rejects heat and the second working fluid 350 condenses within the condenser. In the heat exchanger 380, the third working fluid 308, which may flow within a conduit 386, absorbs heat. This heat absorption may vaporize the third working fluid 308, whereby the third working fluid 308 is steam when it exits the heat exchanger 380.

In one instance, when the SLHX 368 is incorporated into the second heat pump cycle 304, the SLHX 368 receives the second working fluid 350 from the heat exchanger 380 in a second passage of the SLHX 368. In other words, the second working fluid 350 exits the heat exchanger 380 at the heat exchanger outlet 384 and enters the SLHX 368 at the SLHX inlet 388. A conduit 352 connects the heat exchanger outlet 384 to the SLHX inlet 388, thereby establishing fluid communication between the heat exchanger 380 and the SLHX 368. In the second passage of the SLHX 368, the second working fluid 350 rejects heat, thereby cooling (i.e., precooling) the second working fluid 350 before it exits the SLHX 368 at the SLHX outlet 390.

In other instances, the second heat pump cycle 304 does not include the SLHX 368. In other words, the second working fluid 350 exits the heat exchanger 380 at the heat exchanger outlet 384 and enters the expansion valve 360 at the expansion valve inlet 392. A conduit 352 connects the heat exchanger outlet 384 to the expansion valve inlet 392, thereby establishing fluid communication between the heat exchanger 380 and the expansion valve 360.

An expansion valve 360 receives the second working fluid 350 from the SLHX 368. In other words, the second working fluid 350 exits the SLHX 368 at the SLHX outlet 390 and enters the expansion valve 360 at the expansion valve inlet 392. A conduit 352 connects the SLHX outlet 390 to the expansion valve inlet 392, thereby establishing fluid communication between the SLHX 368 and the expansion valve 360. In the expansion valve 360, the second working fluid 350 is expanded to a lower pressure, which decreases the temperature, before the second working fluid 350 exits the expansion valve 360 at the expansion valve outlet 362.

A third working fluid 308 may absorb heat from the heat exchanger 380, as illustrated in FIG. 3. In other words, the heat exchanger 380 may receive the third working fluid 308. Within the heat exchanger 380, the second working fluid 350 rejects heat and the third working fluid 308 absorbs heat. In one instance, the heat exchanger 380 may include the condenser of the second heat pump cycle 304, whereby the condenser rejects heat and the third working fluid 308 absorbs heat. The second working fluid 350 is condensed as it rejects heat within the condenser. In one instance, the heat exchanger 380 may be a steam generator. Within the steam generator, the third working fluid 308 may absorb sufficient heat to vaporize.

In one instance, the third working fluid 308 may be supplied to the heat exchanger 380 via a conduit 386. In other words, the conduit 386 for the third working fluid 308 is thermally coupled to the second heat pump cycle 304 by the heat exchanger 380.

In one instance, a mechanical pump 301 may increase the pressure of the third working fluid 308. The mechanical pump 301 may be upstream from the heat exchanger 380, whereby the heat exchanger 380 receives the third working fluid 308 from the mechanical pump 301. In other words, the third working fluid 308 exits the mechanical pump 301 at the mechanical pump outlet 303 and enters the heat exchanger 380 at a heat exchanger inlet 305. A conduit 386 connects the mechanical pump outlet 303 to the heat exchanger inlet 305, thereby establishing fluid communication between the mechanical pump 301 and the heat exchanger 380. The third working fluid 308 exits the heat exchanger 380 at a heat exchanger outlet 307 and may enter a conduit 386.

In one instance, a steam compressor 306 may increase the pressure and temperature of the third working fluid 308. The steam compressor 306 may be downstream from the heat exchanger 380, whereby the steam compressor 306 receives the third working fluid 308 from the heat exchanger 380. In other words, the third working fluid 308 exits the heat exchanger 380 at the heat exchanger outlet 307 and enters the steam compressor 306 at the steam compressor inlet 309. A conduit 386 connects the heat exchanger outlet 307 to the steam compressor inlet 309, thereby establishing fluid communication between the heat exchanger 380 and the steam compressor 306.

In the steam compressor 306, the third working fluid 308 is compressed to a higher pressure and temperature. In one instance, the steam compressor 306 increases the pressure and temperature of the third working fluid 308 to turn the third working fluid 308 into steam before the third working fluid 308 exits the steam compressor 306 at the steam compressor outlet 311. The steam may enter a conduit 386 connected to the steam compressor outlet 311. In one instance, the steam compressor 306 delivers steam at a temperature equal to or greater than 120 degrees Celsius. In one instance, the steam compressor 306 is a high-efficiency compressor. In one instance, the steam compressor 306 may be a centrifugal compressor. In one instance, the steam compressor 306 may be electrically powered.

In one instance, the third working fluid 308 is water. Within the heat exchanger 380, the water absorbs heat from the second working fluid 350 of the second heat pump cycle 304. In one example, the pressure of the water may be greater than or equal to the target steam saturation temperature when the water exits the heat exchanger 380 at the heat exchanger outlet 307. In other words, the water may absorb sufficient heat from the second heat pump cycle 304 to evaporate into steam. After the heat exchanger 380, a steam compressor 306 may be used to directly increase the pressure and temperature of the steam. In one example, the pressure of the water may be less than the target steam saturation temperature when the water exits the heat exchanger 380 at the heat exchanger outlet 307. Therefore, the steam compressor 306 may be used to increase the pressure of the water to the required saturation temperature.

Turning back to the first heat pump cycle 302 and the heating for it, a transfer fluid 313 may reject heat to the heat exchanger 322, as illustrated in FIG. 3. In other words, the heat exchanger 322 receives the transfer fluid 313. Within the heat exchanger 322, the transfer fluid 313 rejects heat and the first working fluid 318 absorbs heat. In one instance, the heat exchanger 322 may include the evaporator of the first heat pump cycle 302, whereby the transfer fluid 313 rejects heat and the evaporator absorbs heat. The first working fluid 318 is evaporated as it absorbs heat within the evaporator. In one instance, the heat exchanger 322 may be a low-temperature evaporator.

In one instance, the transfer fluid 313 may be supplied to the heat exchanger 322 via a conduit 315. In other words, the conduit 315 for the transfer fluid 313 is coupled to the first heat pump cycle 302 by the heat exchanger 322.

In one instance, a mechanical pump 317 may increase the pressure of the transfer fluid 313. The mechanical pump 317 may be upstream from the heat exchanger 322, whereby the heat exchanger 322 receives the transfer fluid 313 from the mechanical pump 317. In other words, the transfer fluid 313 exits the mechanical pump 317 at the mechanical pump outlet 319 and enters the heat exchanger 322 at a heat exchanger inlet 321. A conduit 315 connects the mechanical pump outlet 319 to the heat exchanger inlet 321, thereby establishing fluid communication between the mechanical pump 317 and the heat exchanger 322. The transfer fluid 313 exits the heat exchanger 322 at a heat exchanger outlet 323 and may enter a conduit 315.

In one instance, the transfer fluid 313 is ambient air, whereby the heat exchanger 322 of the first heat pump cycle 302 utilizes ambient air as a heat source (i.e., air sourced). The heat exchanger 322 of the first heat pump cycle 302 may capture heat from the ambient air. The heat is absorbed by the heat exchanger 322 of the first heat pump cycle 302, thereby evaporating the first working fluid 318 within the first heat pump cycle 302.

In other instances, the transfer fluid 313 may be liquid that is connected to a low temperature heat source. In one instance, the low temperature heat source may be ambient air. In other instances, the first heat pump cycle 302 may be coupled to another low temperature heat source. For example, the low temperature heat source could be a liquid loop that rejects heat to the air, the ground, or another co-located cooling load. In one example, the liquid loop may contain water.

A control system may be in electrical communication with the first heat pump cycle 302 and the second heat pump cycle 304. The control system may control the delivery of heat from a first heat source and/or a second heat source to the third working fluid 308. The first heat source may include the first heat pump cycle 302 and the second heat pump cycle 304. The second heat source may include an alternate heat source such as a thermal storage steam system, a fuel boiler (e.g., natural gas, coal, biomass), among other possible heat sources. The control system may also control the source of electrical power supplied to the first and second heat pump cycles 302, 304. For instance, the first and second heat pump cycles 302, 304 may be electrically coupled to the electrical grid and a solar grid. When conditions are favorable based on availability, price, and output needs, the first and second heat pump cycles 302, 304 may be supplied power from one or both of the electrical grid and the solar grid.

Figure 4:
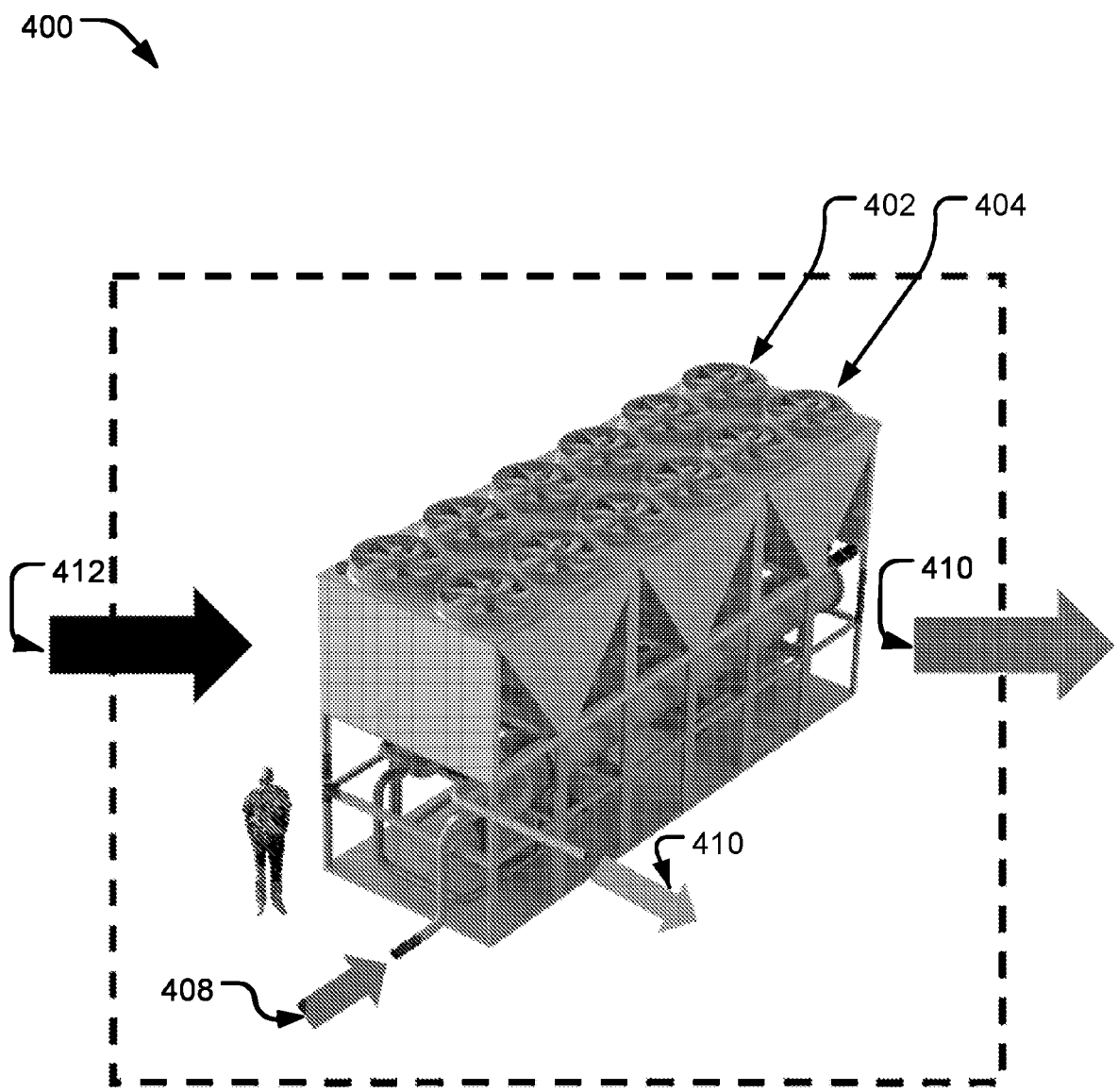
FIG. 4 is a diagram of a modular, cascading, air-source heat pump system.

FIG. 4 illustrates an exemplary steam generation system 400 in an industrial application. A specific example of the components of such a system will be shown and described in more detail in reference to FIG. 10. FIG. 4 provides an overview of the system 400, which includes a two-stage air-source heat pump comprising a bottoming heat pump 402 (i.e., a first heat pump) and a topping heat pump 404 (i.e., a second heat pump) that are thermally coupled together by an intermediate heat exchanger (i.e., a heat exchanger). In the intermediate heat exchanger, the working fluid in the bottoming heat pump 402 rejects heat to the working fluid in the topping heat pump 404. Then, in a steam generator (i.e., a heat exchanger) the working fluid of the topping heat pump 404 rejects heat to a third working fluid 408. In some instances, the steam generation system 400 may also include a steam compressor (not shown in FIG. 4), which is configured to increase the temperature and pressure of the third working fluid 408 after the third working fluid 408 absorbs heat from steam generator.

Each of the heat pumps 402, 404 are used to "pump" lower temperature heat to a higher temperature by using an electrical energy source. Currently available heat pumps either do not generate a large enough temperature lift to produce steam, or they require the use of a higher temperature waste heat stream as the energy source. As described herein, the system 400 utilizes a "cascading" or series of heat pump cycles in thermal connection with each other that progressively raise the temperatures to deliver decarbonized steam at a lower cost than alternative sources. The system 400 does not require waste heat to deliver high temperature steam.

The steam generation system 400 of FIG. 4 may be generally applicable to a variety of industrial processes and/or manufacturing environments. For example, the steam generation system 400 may be used to generate industrial steam. In one instance, the bottoming heat pump 402 and the topping heat pump 404 may be modular, electric-powered air-source heat pumps arranged in a thermally cascading manner. This modularity may enable industry-specific needs, such as different steam pressures and capacities. While the systems in this application illustrate two heat pump cycles (i.e., topping heat pump and bottoming heat pump), the system is scalable and can be modified to include additional heat pumps. In certain instances, the system may include three heat pump cycles. In certain instances, the system may include four heat pump cycles. In certain instances, the system may include five heat pump cycles. In one instance, the steam generation system 400 may generate steam at a temperature of approximately 150-degrees Celsius and at a pressure of approximately 4.5 bar, which may satisfy a majority of industrial steam production needs including the food, paper, and chemical industries.

In the steam generation system 400 of FIG. 4, the bottoming heat pump 402 may utilize ambient air as a heat source (i.e., air sourced). The evaporator (i.e., heat exchanger) of the bottoming heat pump 402 captures heat from the ambient air. The heat is absorbed by the evaporator of the bottoming heat pump 402, thereby evaporating the working fluid within the bottoming heat pump 402.

The topping heat pump 404 is thermally coupled to the bottoming heat pump 402 by an intermediate heat exchanger. In one instance, the intermediate heat exchanger comprises the condenser of the bottoming heat pump 402 and the evaporator of the topping heat pump 404. Thus, within the intermediate heat exchanger, the condenser of the bottoming heat pump 402 rejects heat and the evaporator of the topping heat pump 404 absorbs heat.

The conduit (i.e., pipe providing the fluid flow path) for a third working fluid 408 is coupled to the topping heat pump 404 by a steam generator (i.e., heat exchanger). In one instance, the steam generator comprises the condenser of the topping heat pump 404 and the conduit for a third working fluid 408. Thus, within the steam generator, the condenser of the topping heat pump 404 rejects heat, and the third working fluid 108 absorbs heat.

Before entering the steam generator, a mechanical pump may be used to increase the pressure of the third working fluid 408. After the third working fluid 408 exits the steam generator, a steam compressor may be used to increase the pressure and the temperature of the third working fluid 408. Thus, a mechanical pump may be installed before the steam generator, a steam compressor may be installed after the steam generator, or both.

In one instance, the third working fluid 408 is water. Within the steam generator, the water absorbs heat from the working fluid of the topping heat pump 404. In one example, the pressure of the water may be greater than or equal to the target steam saturation temperature. In other words, the water may absorb sufficient heat from the topping heat pump 404 to evaporate into steam 410. After the steam generator, a steam compressor may be used to directly increase the pressure and temperature of the steam 410. In one example, the pressure of the water may be less than the target steam saturation temperature after exiting the steam generator and, therefore, the steam compressor may be used to increase the pressure of the water to the required saturation temperature. The system 400 may be retrofitted to existing steam generation systems within facilities. Alternatively, the system 400 may include a steam generation system as part of the overall system 400.

The steam generation system 400 may be powered by electricity 412. In other words, electricity 412 is input into the steam generation system 400 in order to generate steam 410. For example, the steam generation system 400 may be powered through grid electricity, onsite renewable energy, or a combination thereof. The steam generation system 400 may enable economic decarbonization of industrial steam production, as steam energy in the industrial sector accounts for almost 4 quads of U.S. primary energy consumption and emits more than 200 MMtonne of $CO_2$ every year.

In some instances, the steam generation system 400 may incorporate energy arbitrage as described in reference to FIG. 1. In other words, energy arbitrage may be used in conjunction with the steam generation system 400 by incorporating additional systems that can provide heating to the steam generation system 400 and/or provide electricity to the heat pump systems described herein. The additional systems could include solar arrays, thermal storage systems, and fuel boilers (e.g., natural gas, coal, waste products, or biomass), among other systems. These systems can be coupled to the steam generation system 400 and/or the heat pump systems and selectively actuated to provide heat to the system 400 and/or electricity to the heat pump systems. The specific system that provides heat to the steam generation system 400 and/or electricity to the heat pump systems can be determined by the availability, the price of the energy source of the system applying heat or electricity, as well as other factors including the requirements of the steam generation system 400. By incorporating energy arbitrage, the steam generation system 400 is capable of generating consistent steam delivery while significantly reducing carbon emissions.

In some instances, the steam generation system 400 may include more than two heat pumps arranged in a thermal cascading manner to heat pump air to generate steam. In one instance, the steam generation system 400 may include three heat pumps. For example, the steam generation system 400 may include a bottoming heat pump (i.e., a first heat pump), an intermediate heat pump (i.e., a second heat pump), and a topping heat pump (i.e., a third heat pump). In another instance, the steam generation system 400 may include four heat pumps. For example, the steam generation system 400 may include a bottoming heat pump (i.e., a first heat pump), a first intermediate heat pump (i.e., a second heat pump), a second intermediate heat pump (i.e., a third heat pump), and a topping heat pump (i.e., a fourth heat pump). In another instance, the steam generation system 400 may include five heat pumps.

In one instance, the bottoming heat pump 402 is coupled to the ambient air (i.e., air sourced). However, in other instances, the bottoming heat pump 402 may be coupled to another low temperature heat source. For example, the low temperature heat source could be a liquid loop that rejects heat to the air, the ground, or another co-located cooling load. In one example, the liquid loop may contain water.

Figure 5:
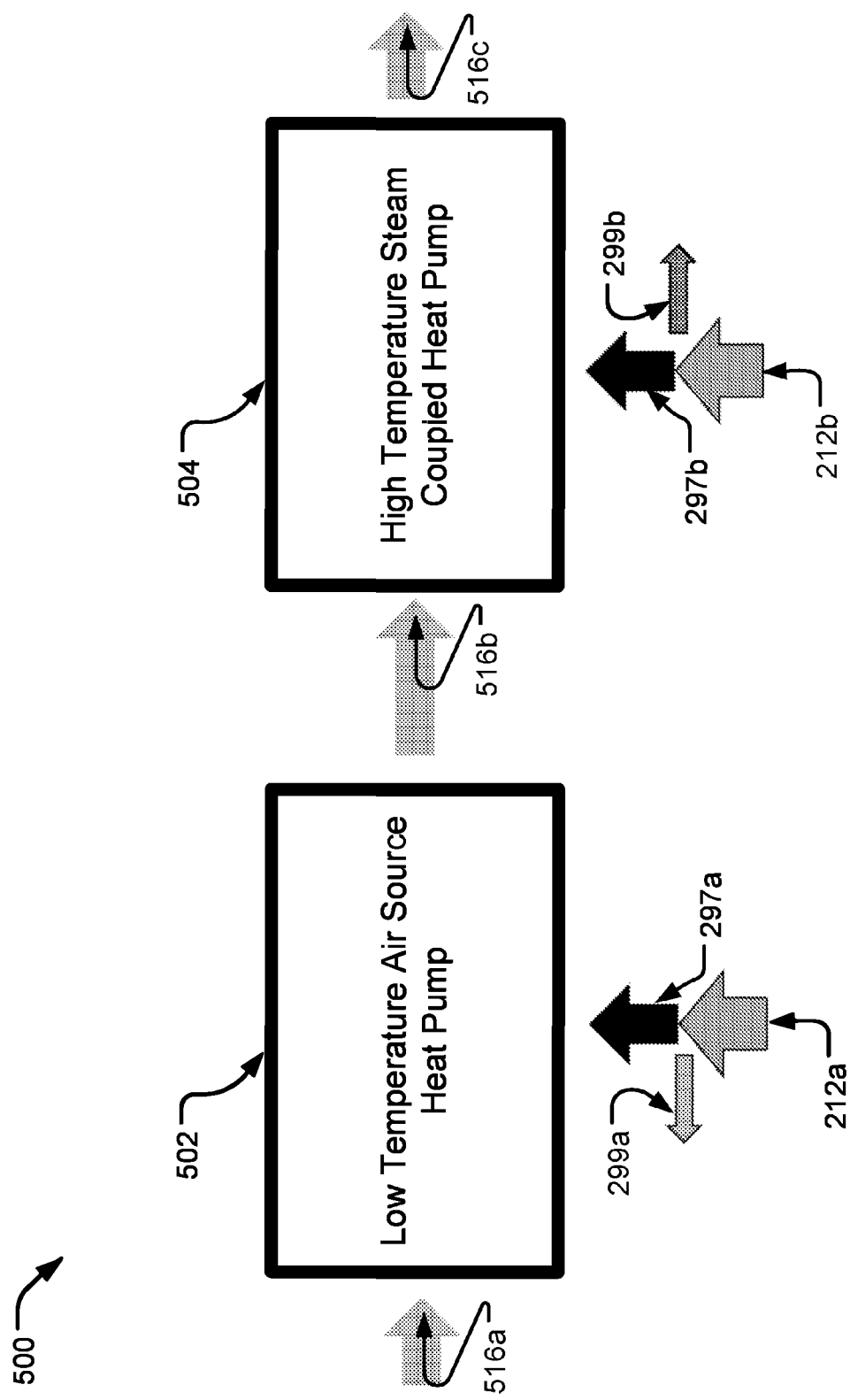
FIG. 5 is a diagram of the cascading heat pump system, comprising a low temperature air source heat pump and a high temperature stream coupled heat pump.

FIG. 5 illustrates a partial diagram of a steam generation system 500, which is a partial embodiment of the steam generation system 400 illustrated in FIG. 4. The steam generation system 500 includes a bottoming heat pump 502 (i.e., a first heat pump) and a topping heat pump 504 (i.e., a second heat pump) arranged in a thermally cascading manner. The bottoming heat pump 502 may be a low temperature air source heat pump and the topping heat pump 504 may be a high temperature steam coupled heat pump. The steam generation system 500 may also include a steam compressor (not shown in FIG. 5).

The steam generation system 500 may include cascading heat pumps that incorporate high-efficiency components to achieve a coefficient of performance greater than two without using waste heat. For example, high-efficiency components may include high-efficiency refrigerant compressors and motors. In one instance, the compressors may be equal to or greater than 85% efficient, and the motors may be equal to or greater than 93% efficient.

For example, a 1 thermal megawatt (MWth) steam generation system 500 may produce 150-degree Celsius steam at a nominal ambient temperature of 20-degrees Celsius. In other words, the steam generation system 500 may provide a temperature lift from 20-degrees Celsius to 150-degrees Celsius at a coefficient of performance greater than two without requiring waste heat.

Heat transfer 516a involves the bottoming heat pump 502 capturing heat from the ambient air by evaporating a working fluid, which may be a refrigerant. In one instance, the ambient air may be approximately 20-degrees Celsius, and the working fluid may be evaporated at 15-degrees Celsius. Electricity 212a may be applied to the bottoming heat pump 502, which may include a 88.5 kilowatt-electric (kWe) high efficiency compressor and motor. In one instance, the compressor power 297a may consume 75.5 kilowatts (kw). In one instance, the fan power and losses 299a may be 13 kWe.

Heat transfer 516b involves the condenser from the bottoming heat pump 502 rejecting heat to the evaporator in the topping heat pump 504, thereby evaporating the working fluid in the topping heat pump 504. The working fluid in the topping heat pump 504 may be a refrigerant. In one instance, the working fluid in the topping heat pump 504 may be evaporated at 60-degrees Celsius. Electricity 212b may be applied to the topping heat pump 504, which may include a 159.2 kWe high efficiency compressor and motor. In one instance, the compressor power 297b may consume 146 kw. In one instance, the fan power and losses 299b may be 13.2 kWe.

Heat transfer 516c involves the condenser from the topping heat pump 504 rejecting heat to an evaporating water stream. Thus, 1 MWth of steam is delivered at a 150-degrees Celsius saturation temperature.

Figure 6:
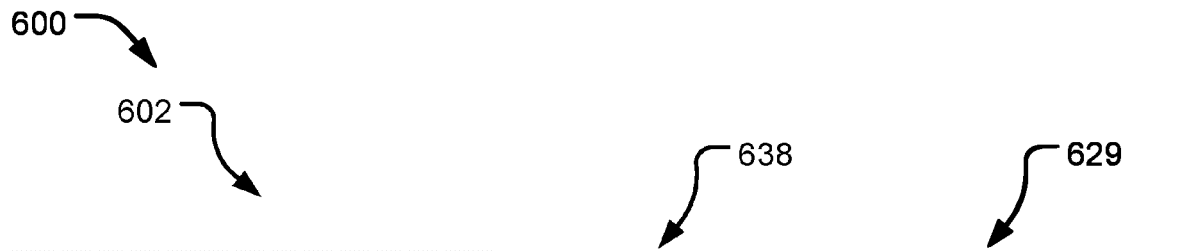
FIG. 6 is a table that includes exemplar design specification for a two-stage compressor for the bottom cycle.

FIG. 6 is a table outlining an exemplary design specification for a two-stage compressor for the bottom cycle 602 of the steam generation system 600, which is a partial embodiment of the steam generation system 500 illustrated in FIG. 5. This compressor will be further shown and described with reference to the first heat pump cycle 1002 of the steam generation system 100 of FIG. 10. In one instance, the compressor in the bottom cycle 602 may comprise two-stage compression with a single shaft and motor. In other words, the first-stage of the compressor may comprise a first compressor 638, and the second-stage of the compressor may comprise a second compressor 629. In one instance, a motor may turn a shaft that drives both the first compressor 638 and the second compressor 629 (i.e., the compressors are rotatably coupled together on a shafter and powered by the same motor) (shown subsequently in FIG. 10). The specific speed ($N_s$) of the compressor versus the specific diameter ($D_s$) of the compressor may result in an efficiency equal to or greater than 80% efficient. The total electrical efficiency may be approximately 94.1% efficient.

Figure 7:
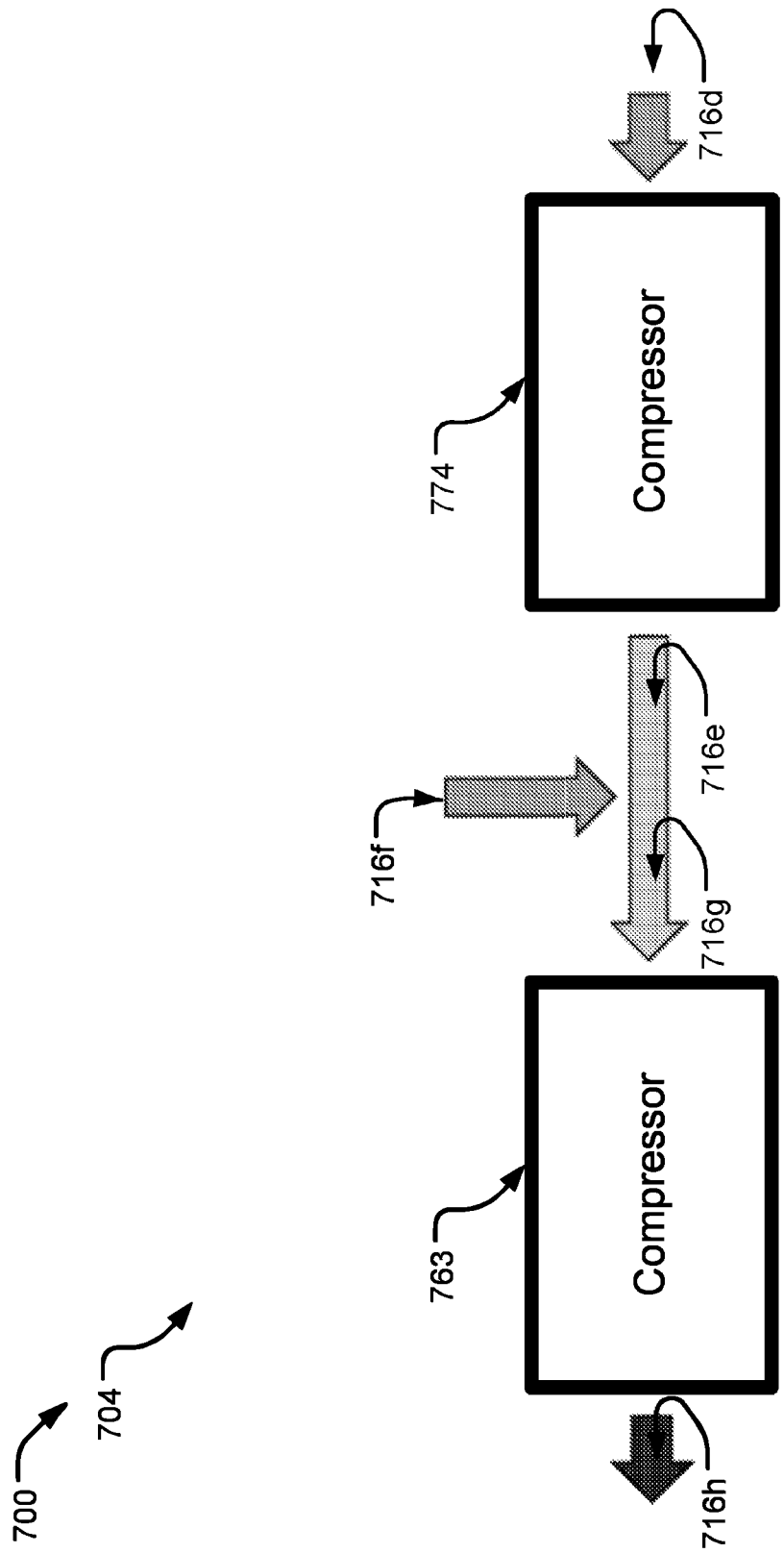
FIG. 7 is a diagram of a design for a two-stage compressor for the topping cycle.

FIG. 7 is a diagram of a design for a two-stage compressor for the topping cycle 704 of the steam generation system 700, which is a partial embodiment of the steam generation system 400 illustrated in FIG. 4. In one instance, the compressors may comprise two-stage compression with two shafts and motors. In other words, the first-stage of the compressor may comprise a first compressor 774, and the second-stage of the compressor may comprise a second compressor 763. In one instance, a first motor may turn a shaft that drives the first compressor 774, and a second motor may turn a separate shaft that drives the second compressor 763 (i.e., the compressors are on separate shafts that are powered by separate motors). This type of compressor is shown and described in reference to FIG. 10.

The separate stages may reduce windage losses in the compressor motor. Moreover, the separate stages may isolate the higher risk components. For example, the second compressor 763 is a higher temperature compressor, which may create heightened risks. Thus, separating the second compressor 763 by providing a separate motor and shaft from the first compressor 774 may isolate the rest of the steam generation system 700 from these challenges.

In one instance, the working fluid in the topping cycle 704 may enter the first compressor 774 (i.e., at the inlet) at a temperature 716d of approximately 103 degrees Celsius. The first compressor 774 compresses the working fluid, which increases the temperature and pressure of the working fluid. The working fluid may exit the first compressor 774 (i.e., at the outlet) at a temperature 716e of approximately 144 degrees Celsius. The temperature 716° F. of the working fluid from the economizer (which is shown and described in reference to FIG. 10) may be approximately 104-degrees Celsius. The two streams of the working fluid (which are at different temperatures) mix together, so that the temperature of the working fluid may enter the second compressor 763 (i.e., at the inlet) at a temperature 716g of approximately 132 degrees Celsius. The second compressor 763 compresses the working fluid, which increases the temperature and pressure of the working fluid. The working fluid may exit the second compressor 763 (i.e., at the outlet) at a temperature 716h of approximately 174 degrees Celsius.

Figure 8:
FIG. 8 is a table that includes exemplar design specification for a two-stage compressor for the topping cycle.

FIG. 8 is a table outlining an exemplary design specification for a two-stage compressor for the topping cycle 804 of the steam generation system 800, which is a partial embodiment of the steam generation system 700 illustrated in FIG. 7. Such a compressor design can be seen and implemented in the system 1000 of FIG. 10 in the topping heat pump cycle 1004. Continuing with FIG. 8, in one instance, the compressor in the topping cycle 804 may comprise two-stage compression with two shafts and motors. In other words, the first stage of the compressor may comprise a first compressor 874, and the second stage of the compressor may comprise a second compressor 863. In one instance, a first motor may turn a shaft that drives the first compressor 874, and a second motor may turn a separate shaft that drives the second compressor 863 (i.e., the compressors use different shafts and motors). The specific speed ($N_s$) of the compressor versus the specific diameter ($D_s$) of the compressor may result in an efficiency equal to or greater than 80%.

Figure 9:
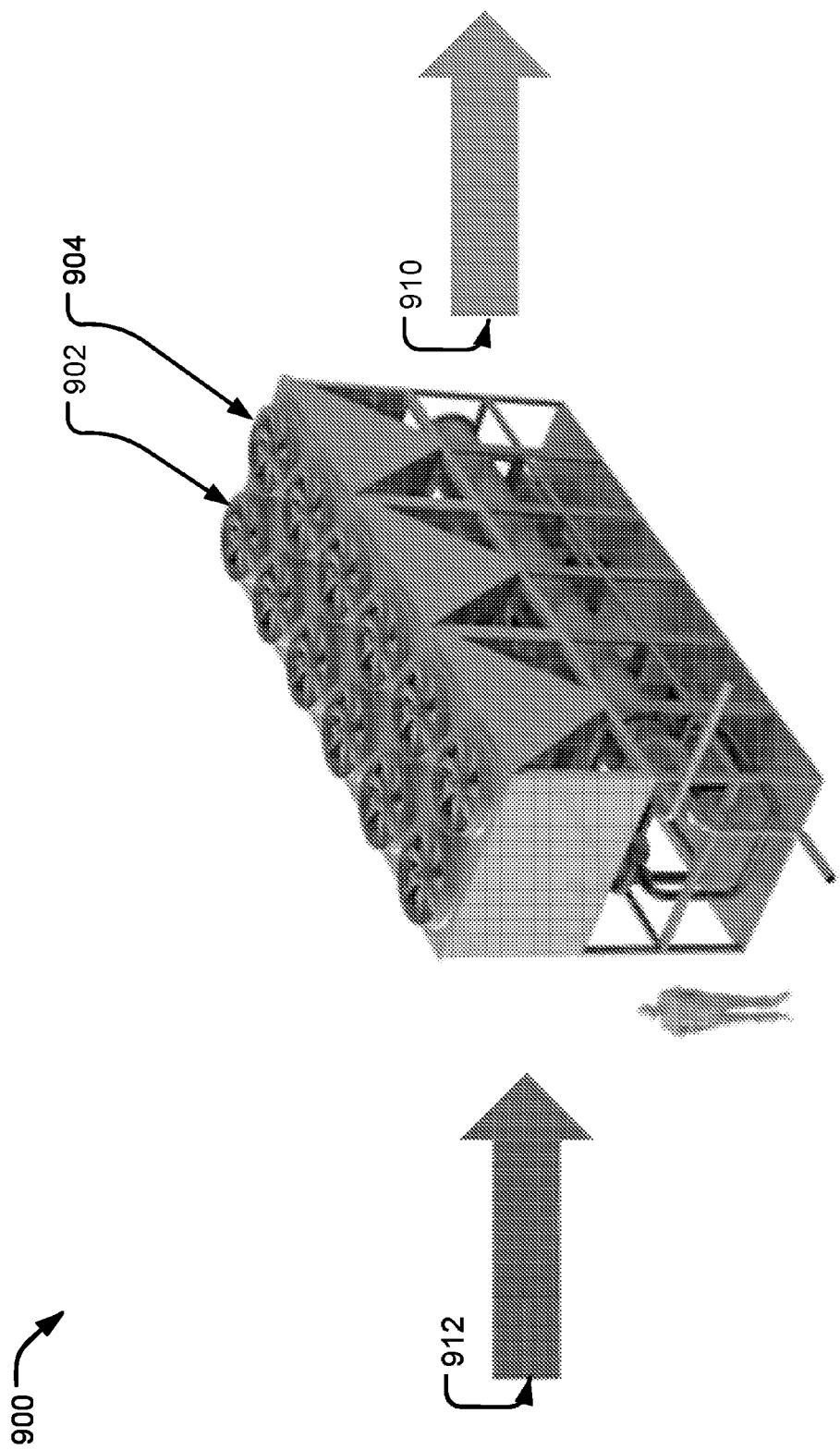
FIG. 9 is a diagram of the electric power input and thermal power output.

FIG. 9 is a diagram of the electric power input and thermal power output of the steam generation system 900, which is a partial embodiment of the steam generation system 400 illustrated in FIG. 4. The steam generation system 900 comprises a bottoming heat pump 902 and a topping heat pump 904. The electric power input may comprise electricity 912, which may be approximately 0.5 megawatt-electric (MWe). The thermal power output may comprise steam 910, which may be approximately 1.0 thermal megawatt (MWth) of steam 910 that is delivered at a 150-degrees Celsius saturation temperature.

Figure 10:
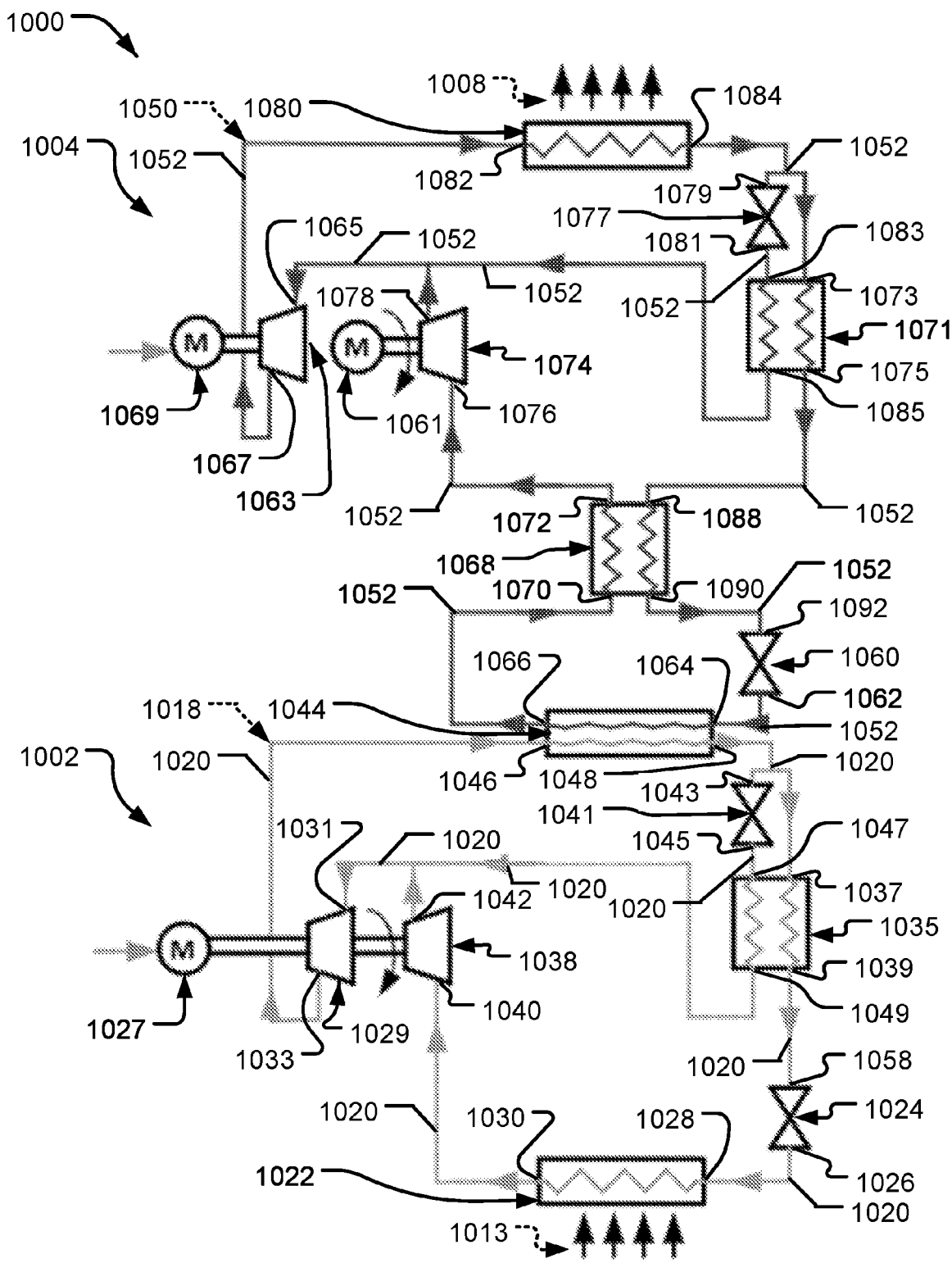
FIG. 10 is a diagrammatic view of a steam generation system comprising a bottoming heat pump cycle and a topping heat pump cycle, with an economizer and suction-line heat exchangers.

FIG. 10 illustrates a steam generation system 1000 including many of the elements described in reference to FIGS. 4 through 9. FIG. 10 is a diagrammatic view of the steam generation system 1000, which includes a first heat pump cycle 1002 (i.e., a bottoming heat pump cycle) and a second heat pump cycle 1004 (i.e., a topping heat pump cycle) in thermal communication with each other. The steam generation system 1000 may also include a steam compressor (not shown in FIG. 10) that is in thermal communication with the second heat pump cycle 1004.

The first heat pump cycle 1002 circulates a first working fluid 1018 via a conduit 1020 of the first heat pump cycle 1002, as illustrated in FIG. 10. In one instance, the first working fluid 1018 may be a fluorocarbon. As nonlimiting examples, the fluorocarbon may be R1234ze(z) or R1234ze (E). In one instance, the first working fluid 1018 may be a hydrofluoroolefin. As a nonlimiting example, the hydrofluoroolefin may be R514a. In one instance, the first working fluid 1018 may be a hydrofluoroether. In one instance, the first working fluid 1018 may be a hydrocarbon. In one instance, the first working fluid 1018 may be carbon dioxide. In one instance, the first working fluid 1018 may be ammonia. In one instance, the first working fluid 1018 may be water. In one instance, the first working fluid 1018 may be an engineered fluid. As a nonlimiting example, the engineered fluid may be Novec 649.

In the first heat pump cycle 1002, a heat exchanger 1022 receives the first working fluid 1018 from an expansion valve 1024. In other words, the first working fluid 1018 exits the expansion valve 1024 at the expansion valve outlet 1026 and enters the heat exchanger 1022 at the heat exchanger inlet 1028. A conduit 1020 connects the expansion valve outlet 1026 to the heat exchanger inlet 1028, thereby establishing fluid communication between the expansion valve 1024 and the heat exchanger 1022. In the heat exchanger 1022, the first working fluid 1018 absorbs heat. This heat absorption may vaporize the first working fluid 1018, whereby the first working fluid 1018 is a low-pressure vapor when it exits the heat exchanger 1022 at the heat exchanger outlet 1030. In one instance, the heat exchanger 1022 may include the evaporator of the first heat pump cycle 1002, whereby the evaporator absorbs heat and the first working fluid 1018 is evaporated within the evaporator. In one instance, the heat exchanger 1022 may be a low-temperature evaporator. In one instance, the heat exchanger 1022 may operate at an efficiency greater than or equal to 90%.

A compressor 1038 receives the first working fluid 1018 from the heat exchanger 1022. In other words, the first working fluid 1018 exits the heat exchanger 1022 at the heat exchanger outlet 1030 and enters the compressor 1038 at the compressor inlet 1040. A conduit 1020 connects the heat exchanger outlet 1030 to the compressor inlet 1040, thereby establishing fluid communication between the heat exchanger 1022 and the compressor 1038. In the compressor 1038, the first working fluid 1018 is compressed to a higher pressure, which increases the temperature, before the first working fluid 1018 exits the compressor 1038 at the compressor outlet 1042. Thus, the low-pressure vapor is compressed to a higher pressure. In one instance, the first working fluid 1018 is a medium pressure fluid when it exits the compressor 1038 at the compressor outlet 1042. In one instance, the compressor 1038 is a high-efficiency compressor. In one instance, the compressor 1038 may be a centrifugal compressor. In one instance, the compressor 1038 may be a two-stage centrifugal compressor. In one instance, the compressor 1038 may be electrically powered. A motor 1027 may turn a shaft that drives the compressor 1038. In one instance, the motor 1027 may be a high-speed and/or high-efficiency motor. In one instance, the motor 1027 may be electrically powered.

In one instance, the first heat pump cycle 1002 does not include a suction-line heat exchanger ("SLHX"). However, in other instances, a SLHX (which is not shown in the first heat pump cycle 1002 of FIG. 10) may be incorporated into the first heat pump cycle 1002. In an embodiment of the first heat pump cycle 1002 with a SLHX, the SLHX receives the first working fluid 1018 from the heat exchanger 1022 in a first passage of the SLHX. In other words, the first working fluid 1018 exits the heat exchanger 1022 at the heat exchanger outlet 1030 and enters the SLHX at the SLHX inlet. A conduit connects the heat exchanger outlet 1030 to the SLHX inlet, thereby establishing fluid communication between the heat exchanger 1022 and the SLHX. In the first passage of the SLHX, the first working fluid 1018 absorbs heat, thereby further heating (i.e., preheating) the first working fluid 1018 before it exits the SLHX at the SLHX outlet. Then, the first working fluid 1018 exits the SLHX at the SLHX outlet and enters the compressor 1038 at the compressor inlet 1040. A conduit connects the SLHX outlet to the compressor inlet 1040, thereby establishing fluid communication between the SLHX and the compressor 1038.

Continuing on with a description of the first heat pump cycle 1002 as shown in FIG. 10, a second compressor 1029 receives the first working fluid 1018 from the compressor 1038. In other words, the first working fluid 1018 exits the compressor 1038 at the compressor outlet 1042 and enters the second compressor 1029 at the second compressor inlet 1031. A conduit 1020 connects the compressor outlet 1042 to the second compressor inlet 1031, thereby establishing fluid communication between the compressor 1038 and the second compressor 1029.

In certain instances, the first heat pump cycle 1002 may alternatively not include a second compressor 1029. That is, the first heat pump cycle 1002 may only include a single compressor 1038. In such an instance, the heat exchanger 1044 receives the first working fluid 1018 from the compressor 1038. More particularly, the first working fluid 1018 exits the compressor 1038 at the compressor outlet 1042 and enters the heat exchanger 1044 at the heat exchanger inlet 1046. The conduit connects the compressor outlet 1042 to the heat exchanger inlet 1046, thereby establishing fluid communication between the compressor 1038 and the heat exchanger 1044.

Continuing on with the first heat pump cycle 1002 as shown in FIG. 10, the first working fluid 1018 is compressed to a higher pressure by the second compressor 1029, which increases the temperature, before the first working fluid 1018 exits the second compressor 1029 at the second compressor outlet 1033. In one instance, the second compressor 1029 is a high-efficiency compressor. In one instance, the second compressor 1029 may be a centrifugal compressor. In one instance, the second compressor 1029 may be electrically powered. A motor 1027 may turn a shaft that drives the second compressor 1029. In one instance, the motor 1027 may be a high-speed and/or high-efficiency motor. In one instance, the motor 1027 may be electrically powered. In one instance, the motor 1027 may turn a shaft that drives both the compressor 1038 and the second compressor 1029 (i.e., the compressors use the same shaft and motor). In another instance, the motor 1027 turns a shaft that drives the compressor 1038, and a second motor (i.e., a separate motor not shown in FIG. 10) turns a separate shaft that drives the second compressor 1029 (i.e., the compressors use a different motor and a different shaft). Exemplary design specification for the compressors are shown in FIG. 6.

A heat exchanger 1044 (i.e., the intermediate heat exchanger) thermally couples the first heat pump cycle 1002 with the second heat pump cycle 1004. In one instance, the heat exchanger 1044 receives the first working fluid 1018 from the second compressor 1029. In other words, the first working fluid 1018 exits the second compressor 1029 at the second compressor outlet 1033 and enters the heat exchanger 1044 at the heat exchanger inlet 1046. A conduit 1020 connects the second compressor outlet 1033 to the heat exchanger inlet 1046, thereby establishing fluid communication between the second compressor 1029 and the heat exchanger 1044. In other instances, when the first heat pump cycle 1002 does not include a second compressor 1029, the heat exchanger 1044 receives the first working fluid 1018 from the compressor 1038, as described above.

In the heat exchanger 1044, the first working fluid 1018 rejects heat. This heat rejection may condense the first working fluid 1018 before it exits the heat exchanger 1044 at the heat exchanger outlet 1048. In one instance, the heat exchanger 1044 comprises the condenser of the first heat pump cycle 1002 and the evaporator of the second heat pump cycle 1004. Thus, within the heat exchanger 1044, the condenser of the first heat pump cycle 1002 rejects heat and the evaporator of the second heat pump cycle 1004 absorbs heat. In the heat exchanger 1044, the second working fluid 1050, which circulates within a conduit 1052 within the second heat pump cycle 1004, absorbs heat. This heat absorption may vaporize the second working fluid 1050, whereby the second working fluid 1050 is a low-pressure vapor when it exits the heat exchanger 1044. In one instance, the heat exchanger 1044 may operate at an efficiency greater than or equal to 90%.

Still referring to the first heat pump cycle 1002, an economizer 1035 (i.e., a heat exchanger) may be incorporated into the cycle 1002. When the first heat pump cycle 1002 includes the economizer 1035, the fluid stream of the first working fluid 1018 from the heat exchanger 1044 splits into a primary fluid stream and a secondary fluid stream. Within the economizer 1035, the primary fluid stream of the first working fluid 1018 rejects heat, and the secondary fluid stream of the first working fluid 1018 absorbs heat.

In the primary fluid stream, the economizer 1035 receives the first working fluid 1018 from the heat exchanger 1044 in a first passage of the economizer 1035. In other words, the first working fluid 1018 exits the heat exchanger 1044 at the heat exchanger outlet 1048 and enters the economizer 1035 at an economizer inlet 1037. The conduit 1020 connects the heat exchanger outlet 1048 to the economizer inlet 1037, thereby establishing fluid communication between the heat exchanger 1044 and the economizer 1035. In the first passage of the economizer 1035, the first working fluid 1018 rejects heat, thereby cooling the first working fluid 1018 before it exits the economizer 1035 at the economizer outlet 1039.

In the secondary fluid stream, an expansion valve 1041 receives the first working fluid 1018 from the heat exchanger 1044. In other words, the first working fluid 1018 exits the heat exchanger 1044 at the heat exchanger outlet 1048 and enters the expansion valve 1041 at the expansion valve inlet 1043. The conduit 1020 connects the heat exchanger outlet 1048 to the expansion valve inlet 1043, thereby establishing fluid communication between the heat exchanger 1044 and the expansion valve 1041. In the expansion valve 1041, the first working fluid 1018 is expanded to a lower pressure (i.e., the pressure is reduced), which decreases the temperature, before the first working fluid 1018 exits the expansion valve 1041 at the expansion valve outlet 1045. In one instance, the first working fluid 1018 may partially vaporize, whereby the first working fluid 1018 becomes a two-phase fluid in the expansion valve 1041.

In the secondary fluid stream, the economizer 1035 receives the first working fluid 1018 from the expansion valve 1041 in a second passage of the economizer 1035. In other words, the first working fluid 1018 exits the expansion valve 1041 at the expansion valve outlet 1045 and enters the economizer 1035 at an economizer inlet 1047. The conduit 1020 connects the expansion valve outlet 1045 to the economizer inlet 1047, thereby establishing fluid communication between the expansion valve 1041 and the economizer 1035. In the second passage of the economizer 1035, the first working fluid 1018 absorbs heat, thereby heating the first working fluid 1018 before it exits the economizer 1035 at the economizer outlet 1049. In one instance, in which the first working fluid 1018 is a two-phase fluid, the heat absorption increases the vapor quality of the two-phase fluid.

In the secondary fluid stream, the second compressor 1029 may receive the first working fluid 1018 from the second passage of the economizer 1035. In other words, the first working fluid 1018 exits the economizer 1035 at the economizer outlet 1049 and enters the second compressor 1029 at the second compressor inlet 1031. A conduit 1020 connects the economizer outlet 1049 to the second compressor inlet 1031, thereby establishing fluid communication between the economizer 1035 and the second compressor 1029. In some instances, the conduit 1020 carrying the first working fluid 1018 from the economizer outlet 1049 (i.e., the conduit 1020 exiting the second passage of the economizer 1035) may merge with the conduit 1020 carrying the first working fluid 1018 from the compressor outlet 1042 (i.e., the conduit 1020 exiting the compressor 1038), thereby merging two separate fluid streams (i.e., both fluids being the first working fluid 1018) before entering the second compressor 1029. In one instance, the first working fluid 1018 within the conduit 1020 from the economizer outlet 1049 may be a two-phase fluid stream, and the first working fluid 1018 within the conduit 1020 from the compressor outlet 1042 may be a medium pressure fluid. The two-phase fluid stream (i.e., the first working fluid 1018 exiting the economizer outlet 1049) may be a lower temperature and an approximately equivalent pressure to the medium pressure fluid (i.e., the first working fluid 1018 exiting the compressor outlet 1042). Thus, when the two fluid streams merge, thereby mixing the two fluids, the two-phase fluid stream may cool the medium pressure fluid stream, thereby decreasing the specific work of the second compressor 1029 and improving the overall efficiency of the steam generation system 1000.

In such an instance when the first heat pump cycle 1002 does not include a second compressor 1029, the compressor 1038 may receive the first working fluid 1018 from the economizer 1035. In other words, the first working fluid 1018 exits the economizer 1035 at the economizer outlet 1049 and enters the compressor 1038 at the compressor inlet 1040. A conduit connects the economizer outlet 1049 to the compressor inlet 1040, thereby establishing fluid communication between the economizer 1035 and the compressor 1038.

In other instances, the first heat pump cycle 1002 does not include an economizer 1035. In such an instance, the expansion valve 1024 receives the first working fluid 1018 from the heat exchanger 1044. In other words, the first working fluid 1018 exits the heat exchanger 1044 at the heat exchanger outlet 1048 and enters the expansion valve 1024 at the expansion valve inlet 1058. A conduit 1020 connects the heat exchanger outlet 1048 to the expansion valve inlet 1058, thereby establishing fluid communication between the heat exchanger 1044 and the expansion valve 1024.

In one instance, an expansion valve 1024 receives the first working fluid 1018 from the economizer 1035. In other words, the first working fluid 1018 exits the economizer 1035 at the economizer outlet 1039 and enters the expansion valve 1024 at the expansion valve inlet 1058. A conduit 1020 connects the economizer outlet 1039 to the expansion valve inlet 1058, thereby establishing fluid communication between the economizer 1035 and the expansion valve 1024. In other instances, when the first heat pump cycle 1002 does not include an economizer 1035, the expansion valve 1024 receives the first working fluid 1018 from the heat exchanger 1044, as described above. In the expansion valve 1024, the first working fluid 1018 is expanded to a lower pressure, which decreases the temperature, before the first working fluid 1018 exits the expansion valve 31024 at the expansion valve outlet 1026.

In one instance, such as shown in FIG. 10, the first heat pump cycle 1002 does not include a SLHX. However, in other instances, a SLHX is incorporated into the first heat pump cycle 1002. In such an instance, the SLHX receives the first working fluid 1018 from the economizer 1035 in a second passage of the SLHX. In other words, the first working fluid 1018 exits the economizer 1035 at the economizer outlet 1039 and enters the SLHX at the SLHX inlet. A conduit connects the economizer outlet 1039 to the SLHX inlet, thereby establishing fluid communication between the economizer 1035 and the SLHX. In the second passage of the SLHX, the first working fluid 1018 rejects heat, thereby cooling (i.e., precooling) the first working fluid 1018 before it exits the SLHX at the SLHX outlet. This precooling of the first working fluid 1018 may lower the vapor quality of the first working fluid 1018 before the first working fluid 1018 enters the heat exchanger 1022 at the heat exchanger inlet 1028 and may increase the amount of latent heat transfer that can occur. Then, the first working fluid 1018 exits the SLHX at the SLHX outlet and enters the expansion valve 1024 at the expansion valve inlet 1058. A conduit 1020 connects the SLHX outlet to the expansion valve inlet 1058, thereby establishing fluid communication between the SLHX and the expansion valve 1024.

In one instance, the first heat pump cycle 1002 includes a SLHX, but does not include an economizer 1035. Therefore, the fluid stream of the first working fluid 1018 does not split into a primary fluid stream and a secondary fluid stream. Accordingly, because there is no secondary fluid stream, there is no expansion valve 1041 associated with a secondary fluid stream. In other words, the first working fluid 1018 exits the heat exchanger 1044 at the heat exchanger outlet 1048 and enters the SLHX at the SLHX inlet. A conduit 1020 connects the heat exchanger outlet 1048 to the SLHX inlet, thereby establishing fluid communication between the heat exchanger 1044 and the SLHX. Then, the first working fluid 1018 exits the SLHX at the SLHX outlet and enters the expansion valve 1024 at the expansion valve inlet 1058. A conduit 1020 connects the SLHX outlet to the expansion valve inlet 1058, thereby establishing fluid communication between the SLHX and the expansion valve 1024.

Turning to the second heat pump cycle 1004 of FIG. 10, the second heat pump cycle 1004 circulates a second working fluid 1050. In one instance, the second working fluid 1050 may be a fluorocarbon. As nonlimiting examples, the fluorocarbon may be R1234ze(z) or R1234ze(E). In one instance, the second working fluid 1050 may be a hydrofluoroolefin. As a nonlimiting example, the hydrofluoroolefin may be R514a. In one instance, the second working fluid 1050 may be a hydrofluoroether. In one instance, the second working fluid 1050 may be a hydrocarbon. In one instance, the second working fluid 1050 may be carbon dioxide. In one instance, the second working fluid 1050 may be ammonia. In one instance, the second working fluid 1050 may be water. In one instance, the second working fluid 1050 may be an engineered fluid. As a nonlimiting example, the engineered fluid may be Novec 649.

In one instance, the same fluid may be used for both the first working fluid 1018 and the second working fluid 1050. In other instances, a different fluid may be used for the first working fluid 1018 and the second working fluid 1050.

In one instance, the second heat pump cycle 1004 may contain the same components as the first heat pump cycle 1002. The components of the second heat pump cycle 1004 may be arranged in the same configuration as the components of the first heat pump cycle 1002. The components of the second heat pump cycle 1004 may be arranged in a different configuration than the components of the first heat pump cycle 1002. In other instances, the second heat pump cycle 1004 may contain different components than the first heat pump cycle 1002.

In the second heat pump cycle 1004, the heat exchanger 1044 receives the second working fluid 1050 from an expansion valve 1060. In other words, the second working fluid 1050 exits the expansion valve 1060 at the expansion valve outlet 1062 and enters the heat exchanger inlet 1064. A conduit 1052 connects the expansion valve outlet 1062 to the heat exchanger inlet 1064, thereby establishing fluid communication between the expansion valve 1060 and the heat exchanger 1044. In the heat exchanger 1044, the second working fluid 1050 absorbs heat from the first working fluid 1018 of the first heat pump cycle 1002. This heat absorption may vaporize the second working fluid 1050, whereby the second working fluid 1050 is a low-pressure vapor when it exits the heat exchanger 1044 at the heat exchanger outlet 1066. In one instance, the heat exchanger 1044 comprises the condenser of the first heat pump cycle 1002 and the evaporator of the second heat pump cycle 1004. Thus, within the heat exchanger 1044, the condenser of the first heat pump cycle 1002 rejects heat, and the evaporator of the second heat pump cycle 1004 absorbs heat. In one instance, the heat exchanger 1044 may operate at an efficiency greater than or equal to 90%.

In one instance, a suction-line heat exchanger ("SLHX") 1068 may be incorporated into the second heat pump cycle 1004, as seen in FIG. 10. The SLHX 1068 receives the second working fluid 1050 from the heat exchanger 1044 in a first passage of the SLHX 1068. In other words, the second working fluid 1050 exits the heat exchanger 1044 at the heat exchanger outlet 1066 and enters the SLHX 1068 at the SLHX inlet 1070. A conduit 1052 connects the heat exchanger outlet 1066 to the SLHX inlet 1070, thereby establishing fluid communication between the heat exchanger 1044 and the SLHX 1068. In the first passage of the SLHX 1068, the second working fluid 1050 absorbs heat, thereby further heating (i.e., preheating) the second working fluid 1050 before it exits the SLHX 1068 at the SLHX outlet 1072. Then, the second working fluid 1050 exits the SLHX 1068 at the SLHX outlet 1072 and enters the compressor 1074 at the compressor inlet 1076. A conduit connects the SLHX outlet 1072 to the compressor inlet 1076, thereby establishing fluid communication between the SLHX 1068 and the compressor 1074.

In other instances, the second heat pump cycle 1004 does not include the SLHX 1068. In other words, the second working fluid 1050 exits the heat exchanger 1044 at the heat exchanger outlet 1066 and enters the compressor 1074 at the compressor inlet 1076. A conduit 1052 connects the heat exchanger outlet 1066 to the compressor inlet 1076, thereby establishing fluid communication between the heat exchanger 1044 and the compressor 1074.

Continuing on with the second heat pump cycle 1004 shown in FIG. 10, a compressor 1074 receives the second working fluid 1050 from the SLHX 1068. In other words, the second working fluid 1050 exits the SLHX 1068 at the SLHX outlet 1072 and enters the compressor 1074 at the compressor inlet 1076. A conduit 1052 connects the SLHX outlet 1072 to the compressor inlet 1076, thereby establishing fluid communication between the SLHX 1068 and the compressor 1074. In the compressor 1074, the second working fluid 1050 is compressed to a higher pressure, which increases the temperature, before the second working fluid 1050 exits the compressor 1074 at the compressor outlet 1078. Thus, the low-pressure vapor is compressed to a higher pressure. In one instance, the second working fluid 1050 is a medium pressure fluid when it exits the compressor 1074 at the compressor outlet 1078. In one instance, the compressor 1074 is a high-efficiency compressor. In one instance, the compressor 1074 may be a centrifugal compressor. In one instance, the compressor 1074 may be a two-stage centrifugal compressor. In one instance, the compressor 1074 may be electrically powered. A motor 1061 may turn a shaft that drives the compressor 1074. In one instance, the motor 1061 may be a high-speed and/or high-efficiency motor. In one instance, the motor 1061 may be electrically powered.

In one instance, a second compressor 1063 may be incorporated into the second heat pump cycle 1004 as shown in FIG. 10. The second compressor 1063 receives the second working fluid 1050 from the compressor 1074. In other words, the second working fluid 1050 exits the compressor 1074 at the compressor outlet 1078 and enters the second compressor 1063 at the second compressor inlet 1065. A conduit 1052 connects the compressor outlet 1078 to the second compressor inlet 1065, thereby establishing fluid communication between the compressor 1074 and the second compressor 1063. In other instances, the second heat pump cycle 1004 does not include a second compressor 1063. Thus, the heat exchanger 1080 receives the second working fluid 1050 from the compressor 1074. In other words, the second working fluid 1050 exits the compressor 1074 at the compressor outlet 1078 and enters the heat exchanger 1080 at the heat exchanger inlet 1082. A conduit connects the compressor outlet 1078 to the heat exchanger inlet 1082, thereby establishing fluid communication between the compressor 1074 and the heat exchanger 1080.

In the second compressor 1063, the second working fluid 1050 is compressed to a higher pressure, which increases the temperature, before the second working fluid 1050 exits the second compressor 1063 at the second compressor outlet 1067. In one instance, the second compressor 1063 is a high-efficiency compressor. In one instance, the second compressor 1063 may be a centrifugal compressor. In one instance, the second compressor 1063 may be electrically powered. A motor 1069 may turn a shaft that drives the second compressor 1063. In one instance, the motor 1069 may be a high-speed and/or high-efficiency motor. In one instance, the motor 1069 may be electrically powered. In one instance, the motor 1061 may turn a shaft that drives the compressor 1074, and the motor 1069 may turn a separate shaft that drives the second compressor 1063 (i.e., the compressors use a different motor and shaft). In another instance, one motor (either motor 1061 or motor 1069) may turn a shaft that drives both the compressor 1074 and the second compressor 1063 (i.e., the compressors use the same motor and shaft). Exemplary design specification for the compressors can be seen in FIG. 8.

A heat exchanger 1080 thermally couples the second heat pump cycle 1004 with a third working fluid 1008. In one instance, the heat exchanger 1080 receives the second working fluid 1050 from the second compressor 1063. In other words, the second working fluid 1050 exits the second compressor 1063 at the second compressor outlet 1067 and enters the heat exchanger 1080 at the heat exchanger inlet 1082. A conduit 1052 connects the second compressor outlet 1067 to the heat exchanger inlet 1082, thereby establishing fluid communication between the second compressor 1063 and the heat exchanger 1080. In other instances, when the second heat pump cycle 1004 does not include a second compressor 1063, the heat exchanger 1080 receives the second working fluid 1050 from the compressor 1074, as described above.

In the heat exchanger 1080, the second working fluid 1050 rejects heat. This heat rejection may condense the second working fluid 1050 before it exits the heat exchanger 1080 at the heat exchanger outlet 1084. In one instance, the heat exchanger 1080 may be the condenser of the second heat pump cycle 1004, whereby the condenser rejects heat and the second working fluid 1050 condenses within the condenser. In the heat exchanger 1080, the third working fluid 1008, which may flow within a conduit, absorbs heat. This heat absorption may vaporize the third working fluid 1008, whereby the third working fluid 1008 is steam when it exits the heat exchanger 1080. In one instance, the heat exchanger 1080 may operate at an efficiency greater than or equal to 90%. The third working fluid 1008 may flow through a system that further includes a pump and compressor, as illustrated in FIG. 3.

In one instance, as seen in FIG. 10, an economizer 1071 (i.e., a heat exchanger) may be incorporated into the second heat pump cycle 1004. When the second heat pump cycle 1004 includes the economizer 1071, the fluid stream of the second working fluid 1050 splits into a primary fluid stream and a secondary fluid stream. Within the economizer 1071, the primary fluid stream of the second working fluid 1050 rejects heat and the secondary fluid stream of the second working fluid 1050 absorbs heat.

In the primary fluid stream, the economizer 1071 receives the second working fluid 1050 from the heat exchanger 1080 in a first passage of the economizer 1071. In other words, the second working fluid 1050 exits the heat exchanger 1080 at the heat exchanger outlet 1084 and enters the economizer 1071 at an economizer inlet 1073. A conduit 1052 connects the heat exchanger outlet 1084 to the economizer inlet 1073, thereby establishing fluid communication between the heat exchanger 1080 and the economizer 1071. In the first passage of the economizer 1071, the second working fluid 1050 rejects heat, thereby cooling the second working fluid 1050 before it exits the economizer 1071 at the economizer outlet 1075.

In the secondary fluid stream, an expansion valve 1077 receives the second working fluid 1050 from the heat exchanger 1080. In other words, the second working fluid 1050 exits the heat exchanger 1080 at the heat exchanger outlet 1084 and enters the expansion valve 1077 at the expansion valve inlet 1079. A conduit 1052 connects the heat exchanger outlet 1084 to the expansion valve inlet 1079, thereby establishing fluid communication between the heat exchanger 1080 and the expansion valve 1077. In the expansion valve 1077, the second working fluid 1050 is expanded to a lower pressure (i.e., the pressure is reduced), which decreases the temperature, before the second working fluid 1050 exits the expansion valve 1077 at the expansion valve outlet 1081. In one instance, the second working fluid 1050 may partially vaporize, whereby the second working fluid 1050 becomes a two-phase fluid in the expansion valve 1077.

In the secondary fluid stream, the economizer 1071 receives the second working fluid 1050 from the expansion valve 1077 in a second passage of the economizer 1071. In other words, the second working fluid 1050 exits the expansion valve 1077 at the expansion valve outlet 1081 and enters the economizer 1071 at an economizer inlet 1083. A conduit 1052 connects the expansion valve outlet 1081 to the economizer inlet 1083, thereby establishing fluid communication between the expansion valve 1077 and the economizer 1071. In the second passage of the economizer 1071, the second working fluid 1050 absorbs heat, thereby heating the second working fluid 1050 before it exits the economizer 1071 at the economizer outlet 1085. In one instance, in which the second working fluid 1050 is a two-phase fluid, the heat absorption increases the vapor quality of the two-phase fluid.

In the secondary fluid stream, the second compressor 1063 may receive the second working fluid 1050 from the second passage of the economizer 1071. In other words, the second working fluid 1050 exits the economizer 1071 at the economizer outlet 1085 and enters the second compressor 1063 at the second compressor inlet 1065. A conduit 1052 connects the economizer outlet 1085 to the second compressor inlet 1065, thereby establishing fluid communication between the economizer 1071 and the second compressor 1063. In some instances, the conduit 1052 carrying the second working fluid 1050 from the economizer outlet 1085 (i.e., the conduit 1052 exiting the second passage of the economizer 1071) may merge with the conduit 1052 carrying the second working fluid 1050 from the compressor outlet 1078 (i.e., the conduit 1052 exiting the compressor 1074), thereby merging two separate fluid streams (i.e., both fluids being the second working fluid 1050) before entering the second compressor 1063. In one instance, the second working fluid 1050 within the conduit 1052 from the economizer outlet 1085 may be a two-phase fluid stream and the second working fluid 1050 within the conduit 1052 from the compressor outlet 1078 may be a medium pressure fluid. The two-phase fluid stream (i.e., the second working fluid 1050 exiting the economizer outlet 1085) may be a lower temperature and an approximately equivalent pressure to the medium pressure fluid (i.e., the second working fluid 1050 exiting the compressor outlet 1078). Thus, when the two fluid streams merge, thereby mixing the two fluids, the two-phase fluid stream may cool the medium pressure fluid stream, thereby decreasing the specific work of the second compressor 1063 and improving the overall efficiency of the steam generation system 1000.

In such instances when the second heat pump cycle 1004 does not include a second compressor 1063, the compressor 1074 may receive the second working fluid 1050 from the economizer 1071. In other words, the second working fluid 1050 exits the economizer 1071 at the economizer outlet 1085 and enters the compressor 1074 at the compressor inlet 1076. A conduit connects the economizer outlet 1085 to the compressor inlet 1076, thereby establishing fluid communication between the economizer 1071 and the compressor 1074.

In such instances when the SLHX 1068 is incorporated into the second heat pump cycle 1004 (such as seen in FIG. 10), the SLHX 1068 receives the second working fluid 1050 from the heat exchanger 1080 in a second passage of the SLHX 1068. In other words, the second working fluid 1050 exits the heat exchanger 1080 at the heat exchanger outlet 1084 and enters the SLHX 1068 at the SLHX inlet 1088. A conduit 1052 connects the heat exchanger outlet 1084 to the SLHX inlet 1088, thereby establishing fluid communication between the heat exchanger 1080 and the SLHX 1068. In the second passage of the SLHX 1068, the second working fluid 1050 rejects heat, thereby cooling (i.e., precooling) the second working fluid 1050 before it exits the SLHX 1068 at the SLHX outlet 1090. This precooling of the second working fluid 1050 may lower the vapor quality of the second working fluid 1050 before the second working fluid 1050 enters the heat exchanger 1022 at the heat exchanger inlet 1028 and may increase the amount of latent heat transfer that can occur. Then, the second working fluid 1050 exits the SLHX 1068 at the SLHX outlet 1090 and enters the expansion valve 1060 at the expansion valve inlet 1092. A conduit 1052 connects the SLHX outlet 1090 to the expansion valve inlet 1092, thereby establishing fluid communication between the SLHX 1068 and the expansion valve 1060.

In such instances when the second heat pump cycle 1004 does not include the SLHX 1068, the second working fluid 1050 exits the economizer 1071 at the economizer outlet 1075 and enters the expansion valve 1060 at the expansion valve inlet 1092. A conduit 1052 connects the economizer outlet 1075 to the expansion valve inlet 1092, thereby establishing fluid communication between the economizer 1071 and the expansion valve 1060.

In other instances, the second heat pump cycle 1004 includes a SLHX 1068, but does not include an economizer 1071. Therefore, the fluid stream of the second working fluid 1050 does not split into a primary fluid stream and a secondary fluid stream. Accordingly, because there is no secondary fluid stream, there is no expansion valve 1077 associated with a secondary fluid stream. In other words, the second working fluid 1050 exits the heat exchanger 1080 at the heat exchanger outlet 1084 and enters the SLHX 1068 at the SLHX inlet 1088. A conduit 1052 connects the heat exchanger outlet 1084 to the SLHX inlet 1088, thereby establishing fluid communication between the heat exchanger 1080 and the SLHX 1068. Then, the second working fluid 1050 exits the SLHX 1068 at the SLHX outlet 1090 and enters the expansion valve 1060 at the expansion valve inlet 1092. A conduit 1052 connects the SLHX outlet 1090 to the expansion valve inlet 1092, thereby establishing fluid communication between the SLHX 1068 and the expansion valve 1060.

In other instances, the second heat pump cycle 1004 does not include an economizer 1071 and does not include a SLHX 1068. Thus, the expansion valve 1060 receives the second working fluid 1050 from the heat exchanger 1080. In other words, the second working fluid 1050 exits the heat exchanger 1080 at the heat exchanger outlet 1084 and enters the expansion valve 1060 at the expansion valve inlet 1092. A conduit 1052 connects the heat exchanger outlet 1084 to the expansion valve inlet 1092, thereby establishing fluid communication between the heat exchanger 1080 and the expansion valve 1060.

In one instance, an expansion valve 1060 receives the second working fluid 1050 from the SLHX 1068. In other words, the second working fluid 1050 exits the SLHX 1068 at the SLHX outlet 1090 and enters the expansion valve 1060 at the expansion valve inlet 1092. A conduit 1052 connects the SLHX outlet 1090 to the expansion valve inlet 1092, thereby establishing fluid communication between the SLHX 1068 and the expansion valve 1060. In other instances, when the second heat pump cycle 1004 does not include a SLHX 1068, the expansion valve 1060 receives the second working fluid from the economizer 1071, as described above. In another instance, when the second heat pump cycle 1004 does not include an economizer 1071 and does not include a SLHX 1068, the expansion valve 1060 receives the second working fluid 1050 from the heat exchanger 1080, as described above. In the expansion valve 1060, the second working fluid 1050 is expanded to a lower pressure, which decreases the temperature, before the second working fluid 1050 exits the expansion valve 1060 at the expansion valve outlet 1062.

A third working fluid 1008 may absorb heat from the heat exchanger 1080, as illustrated in FIG. 10. In other words, the heat exchanger 1080 may receive the third working fluid 1008. Within the heat exchanger 1080, the second working fluid 1050 rejects heat, and the third working fluid 1008 absorbs heat. In one instance, the heat exchanger 1080 may include the condenser of the second heat pump cycle 1004, whereby the condenser rejects heat and the third working fluid 1008 absorbs heat. The second working fluid 1050 is condensed as it rejects heat within the condenser. In one instance, the heat exchanger 1080 may be a steam generator. Within the steam generator, the third working fluid 1008 may absorb sufficient heat to vaporize.

In one instance, the third working fluid 1008 may be supplied to the heat exchanger 1080 via a conduit (not shown in FIG. 10). In other words, the conduit for the third working fluid 1008 is coupled to the second heat pump cycle 1004 by the heat exchanger 1080.

In one instance, a mechanical pump (not shown in FIG. 10) may increase the pressure of the third working fluid 1008. A similar embodiment of the pump 301 is shown in FIG. 3. The mechanical pump may be upstream from the heat exchanger 1080, whereby the heat exchanger 1080 receives the third working fluid 1008 from the mechanical pump. In other words, the third working fluid 1008 exits the mechanical pump at the mechanical pump outlet and enters the heat exchanger 1080 at a heat exchanger inlet. A conduit connects the mechanical pump outlet to the heat exchanger inlet, thereby establishing fluid communication between the mechanical pump and the heat exchanger 1080. The third working fluid 1008 exits the heat exchanger 1080 at a heat exchanger outlet and may enter a conduit.

In one instance, a steam compressor (not shown in FIG. 10) may increase the pressure and temperature of the third working fluid 1008. A similar embodiment of the steam compressor 306 can be seen in FIG. 3. The steam compressor may be downstream from the heat exchanger 1080, whereby the steam compressor receives the third working fluid 1008 from the heat exchanger 1080. In other words, the third working fluid 1008 exits the heat exchanger 1080 at the heat exchanger outlet and enters the steam compressor at the steam compressor inlet. A conduit connects the heat exchanger outlet to the steam compressor inlet, thereby establishing fluid communication between the heat exchanger 1080 and the steam compressor.

In the steam compressor, the third working fluid 1008 is compressed to a higher pressure and temperature. In one instance, the steam compressor increases the pressure and temperature of the third working fluid 1008 to turn the third working fluid 1008 into steam before the third working fluid 1008 exits the steam compressor at the steam compressor outlet. The steam may enter a conduit connected to the steam compressor outlet. In one instance, the steam compressor delivers steam at a temperature equal to or greater than 120 degrees Celsius. In one instance, the steam compressor is a high-efficiency compressor. In one instance, the steam compressor may be a centrifugal compressor. In one instance, the steam compressor may be electrically powered.

In one instance, the third working fluid 1008 is water. Within the heat exchanger 1080, the water absorbs heat from the second working fluid 1050 of the second heat pump cycle 1004. In one example, the pressure of the water may be greater than or equal to the target steam saturation temperature when the water exits the heat exchanger 1080 at the heat exchanger outlet. In other words, the water may absorb sufficient heat from the second heat pump cycle 1004 to evaporate into steam. After the heat exchanger 1080, a steam compressor may be used to directly increase the pressure and temperature of the steam. In one example, the pressure of the water may be less than the target steam saturation temperature when the water exits the heat exchanger 1080 at the heat exchanger outlet. Therefore, the steam compressor may be used to increase the pressure of the water to the required saturation temperature.

Referring back to the first heat pump cycle 1002 of FIG. 10, a transfer fluid 1013 may reject heat to the heat exchanger 1022. In other words, the heat exchanger 1022 receives the transfer fluid 1013. Within the heat exchanger 1022, the transfer fluid 1013 rejects heat, and the first working fluid 1018 absorbs heat. In one instance, the heat exchanger 1022 may include the evaporator of the first heat pump cycle 1002, whereby the transfer fluid 1013 rejects heat, and the evaporator absorbs heat. The first working fluid 1018 is evaporated as it absorbs heat within the evaporator. In one instance, the heat exchanger 1022 may be a low-temperature evaporator.

In one instance, the transfer fluid 1013 may be supplied to the heat exchanger 1022 via a conduit (not shown in FIG. 10). In other words, the conduit for the transfer fluid 1013 is coupled to the first heat pump cycle 1002 by the heat exchanger 1022.

In one instance, a mechanical pump (not shown in FIG. 10) may increase the pressure of the transfer fluid 1013. The mechanical pump may be upstream from the heat exchanger 1022, whereby the heat exchanger 1022 receives the transfer fluid 1013 from the mechanical pump. In other words, the transfer fluid 1013 exits the mechanical pump at the mechanical pump outlet and enters the heat exchanger 1022 at a heat exchanger inlet. A conduit connects the mechanical pump outlet to the heat exchanger inlet, thereby establishing fluid communication between the mechanical pump and the heat exchanger 1022. The transfer fluid 1013 exits the heat exchanger 1022 at a heat exchanger outlet and may enter a conduit.

In one instance, the transfer fluid 1013 is ambient air, whereby the heat exchanger 1022 of the first heat pump cycle 1002 utilizes ambient air as a heat source (i.e., air sourced). The heat exchanger 1022 of the first heat pump cycle 1002 may capture heat from the ambient air. The heat is absorbed by the heat exchanger 1022 of the first heat pump cycle 1002, thereby evaporating the first working fluid 1018 within the first heat pump cycle 1002.

In other instances, the transfer fluid 1013 may be liquid that is connected to a low temperature heat source. In one instance, the low temperature heat source may be ambient air. In other instances, the first heat pump cycle 1002 may be coupled to another low temperature heat source. For example, the low temperature heat source could be a liquid loop that rejects heat to the air, the ground, or another co-located cooling load. In one example, the liquid loop may contain water.

The heat generation system of FIG. 10 may additionally include a control system in electrical communication with the first heat pump cycle 1002 and the second heat pump cycle 1004. The control system may control the delivery of heat from a first heat source and/or a second heat source to the third working fluid 1008. The first heat source may include the first heat pump cycle 1002 and the second heat pump cycle 1004. The second heat source may include an alternate heat source such as thermal storage units which are heated via renewable energy sources (e.g., solar arrays). Additionally or alternatively, the control system may control the source of electrical power that is supplied to the first and second heat pump cycles 1002, 1004. The electrical power may be selectively supplied by the electrical grid or a renewable energy source.

Figure 11:
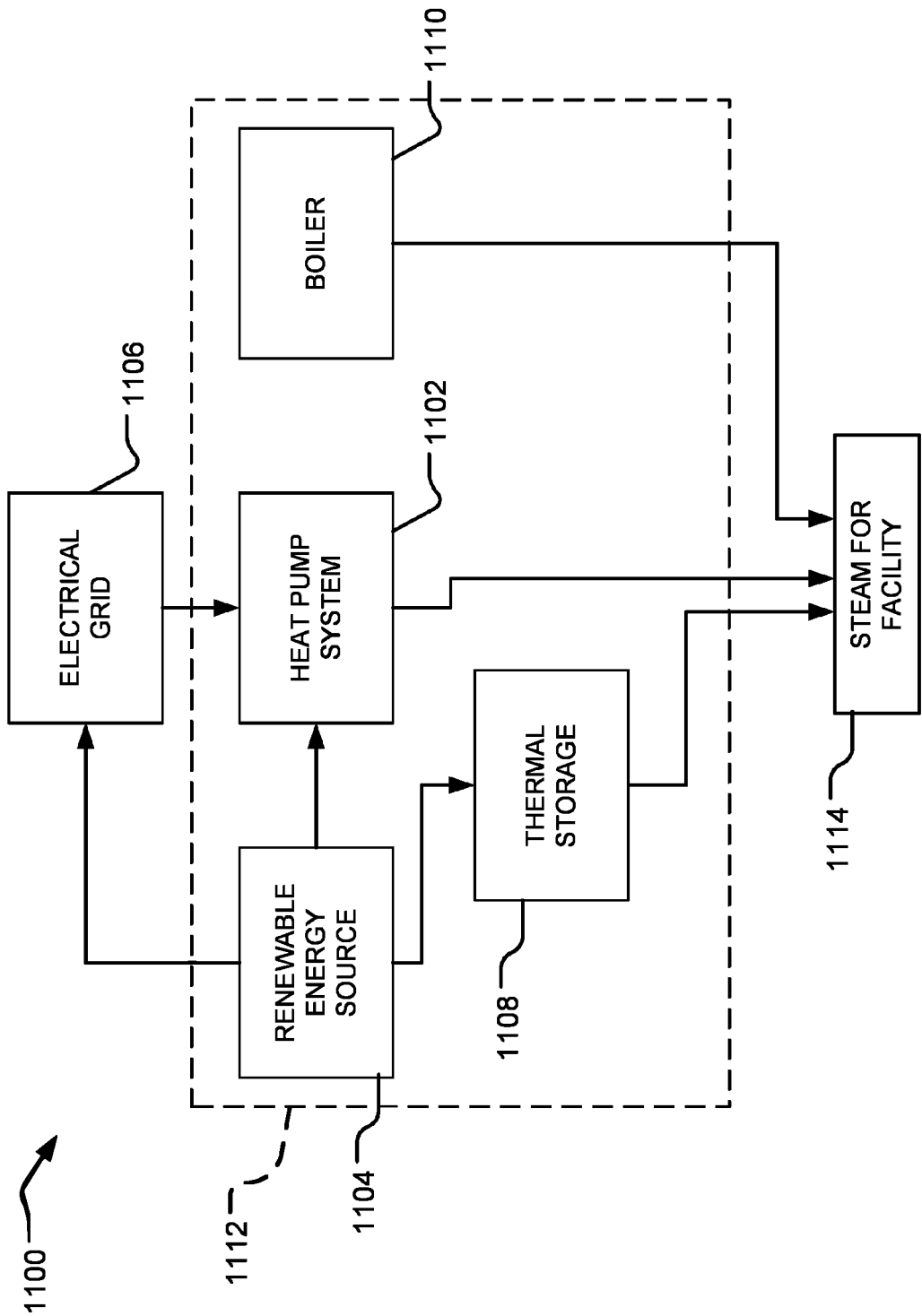
FIG. 11 is a diagram of an energy arbitrage system.

To this end, reference is made to FIG. 11, which is a diagram of an energy arbitrage system 1100 incorporating a cascading heat pump system 1102 (such as the first and second heat pump cycles 1002 and 1004 from FIG. 10 or the first and second heat pump cycles 302 and 304 of FIG. 3) for steam production. The energy arbitrage system 1100 includes multiple thermal energy sources for supplying heat in order to generate steam for industrial applications, among other uses. Additionally, or alternatively, one or more of the thermal energy sources may supply the steam as opposed to supplying heat for a central steam production system.

In one instance, the energy arbitrage system 1100 includes a renewable energy source 1104, which may be a solar array or grid that is in electrical communication with the electric grid 1106. The electric grid 1106 is in electrical communication with and capable of powering the cascading heat pump system 1102. The cascading heat pump system 1102 is also in electrical communication with the renewable energy source 1104, which is capable of supplying power thereto. The renewable energy source 1104 is coupled to an energy storage system 1108 such as a thermal energy storage system capable of storing energy in the form of heat. The thermal storage system 1108 may include one or more storage vessels capable of storing a heated fluid (e.g., steam). The energy storage system 1108 may be an electrical storage unit such as one or more batteries which are able to supply electricity to the cascading heat pump system 1102.

The energy arbitrage system 1100 may also include a boiler 1110, such as a natural gas boiler. The boiler 1110 however may be a different type of boiler such as one burning coal, a biomass, waste products, or another suitable fuel. Each of the boiler 1110, the cascading heat pump system 1102, the renewable energy source 1104, and the energy storage system 1108 may be electrically controlled by the control system 1112. The control system 1112 may control the delivery of either steam and/or heat to an industrial application. In an instance, each of the boiler 1110, the cascading heat pump system 1102, and the energy storage system 1108 (when configured as a thermal energy storage unit) deliver steam 1114 for use in an industrial application, or for another use. In such an instance, the boiler 1110 is capable of delivering steam 1114 when actuated by the control system 1112, the cascading heat pump system 1102 (including steam generation components such as the pump 301, the heat exchanger 380, and the steam compressor 306) is capable of delivering steam 1114 when actuated by the control system 1112, and the energy storage system 1108 is capable of delivering steam 1114 when actuated by the control system 1112. The energy arbitrage system 1110 may function without a control system 1112, and, as such, be controlled manually.

The control system 1112 may utilize the following exemplary parameters in the arbitrage system 1000 to determine which system(s) to operate at a given time. The parameters include but are not limited to renewable electricity generation (kW and kWh), thermal storage capacity or energy stored (kW and kWh), steam output per device (e.g. heat pump, boiler, thermal storage), facility steam demand (steam mass or volume flow rates and steam pressure), and utility prices (e.g., PPA rate, grid electricity rate structure, and fuel prices), among other factors. The control system 1112 can measure steam mass, volume flow rates, and steam pressure coming from the various sources. The control system 1112 can also selectively turn on and off the various energy sources of the arbitrage system 1100 based on the parameters listed above, among others.

The control system 1112 may calculate system performance using the following metrics: steam output divided by electricity input=heat pump efficiency, and steam output divided by natural gas input=boiler efficiency. These metrics may be used to determine whether it is more economical to operate the heat pump, boiler, or other systems. Utility prices, including PPA rate, grid electricity rate structure, and fuel prices, may be used as factors when considering which system to utilize to provide steam. The energy arbitrage system 1110 can be used to efficiently and cost-effectively deliver steam by selectively delivering steam from one or more of the energy input sources. The energy arbitrage system 1110 is capable of maximizing decarbonization in the steam production process.

The following includes a list of exemplary embodiments of the energy arbitrage system 1110. Conventionally, industrial steam 1114 is generated from a boiler (e.g., natural gas boiler) 1110. There is no arbitrage in this configuration as steam is provided by one source only, and there is no ability to alter the energy source input.

A first form of arbitrage using the energy arbitrage system 1100 is to provide steam 1114 only via renewable energy sources 1104 that utilize a thermal storage system 1108. That is, there is no boiler in this configuration. While the energy is supplied by renewable sources, this is an expensive decarbonization option.

A second form of arbitrage using the energy arbitrage system 1100 is to selectively provide steam 1114 from one or both of a boiler 1110 and a cascading heat pump system 1102 which is supplied electricity from a renewable energy source 1104.

The control system is in communication with the renewable energy source 1104 (kWh generated). In this instance, all electricity generated is sent to the heat pump 1102. The control system 1112 can monitor the steam output (e.g., flow rate and pressure) of the heat pump 1102 and the steam demand from the facility (e.g., flow rate and pressure). The control system 1102 can communicate with the boiler 1110 to generate the remainder of the steam required by the facility. The steam output of the boiler 1110 can also be measured (e.g., flow rate and pressure) by the control system 1112.

A third form of arbitrage using the energy arbitrage system 1100 is to provide steam 1114 from one or both of a boiler 1110 and a cascading heat pump system 1102 which is supplied electricity from a renewable energy source 1104. In this configuration, the renewable energy source 1104 also provides electricity to the electric grid 1106 when the supply of electricity exceeds the demands of the cascading heat pump system 1102.

In this configuration, there may be excess electricity from the renewable energy sources 1104. This excess electricity can be supplied to the grid 1106, which in turn can provide credit for demands on the electric grid 1106 (e.g., for supplying electricity to the heat pump system 1102). In this configuration, the control system 1112 may monitor the facility steam demand and the steam output of the heat pump 1102. If the steam output of the heat pump 1102 delivers the entire facility demand, then the control system 1102 communicates with the renewable energy source 1104, and excess electricity is diverted to the grid 1106 (net-metering). At times when the renewable energy source 1104 does not produce sufficient electricity to the heat pumps 1102, the control system 1112 will communicate with the boiler 1110 to provide the remaining steam required for the facility. The control system 1112 may determine the most economically efficient fuel source (electricity from the grid versus fuel for the boiler) given the current energy costs of electricity and fuel, respectively.

A fourth form of arbitrage using the energy arbitrage system 1100 is to provide steam 1114 from only the cascading heat pump system 1102 which is supplied electricity from a renewable energy source 1104. In this configuration, the renewable energy source 1104 also provides electricity to the electric grid 1106 when the supply of electricity exceeds the demands of the cascading heat pump system 1102. The boiler is not used in this configuration. As with the third form of arbitrage, in the fourth form of arbitrage, excess electricity produced from renewable energy sources can be diverted to the grid 1106. In this case, the control system 1112 receives the steam demands from the facility as an input. All of the steam, in this form of arbitrage, is going to be provided by the cascading heat pump system 1102, and the control system 1112 will selectively determine the source of electrical power to the heat pump system 1102. If the renewable energy source 1104 is capable of providing all of the electricity needs for the heat pump system 1102, then the heat pump system 1102 will not draw any electricity from the grid 1106. If there is excess electricity produced from the renewable energy source 1104, then the excess will be sent to the grid 1106 (net metering). If the electricity needs of the heat pump system 1102 are greater than the amount that can be produced by the renewable energy source 1104, then the control system 1112 will utilize as much renewable energy 1104 as possible, and the remainder of the electricity will be pulled from the grid 1106.

In this form, the system 1100 may include a boiler 1110. If the renewable energy sources 1104 do not provide excess electricity, the control system 1112 may communicate with the grid 1106 to pull grid electricity to power the heat pump 1102 instead of signaling the boiler 1110 to deliver steam 1114. This may occur if the control system 1112 determines that the heat pump 1102 operating with a portion of electricity from the grid 1106 is more economical than operating the gas boiler 1110.

A fifth form of arbitrage using the energy arbitrage system 1100 is to provide steam 1114 from one or both of the cascading heat pump system 1102 which is supplied electricity from a renewable energy source 1104 and the energy storage system 1108 connected to the renewable energy source 1104. This configuration avoids grid demand charges and yields complete decarbonization. The grid and gas boiler are not utilized in this configuration. The control system 1112 may monitor steam output from the heat pump system 1102, steam demand of the facility, and renewable electricity generation at the renewable energy source 1104.

If the heat pump system 1102 provides complete steam demands for the facility, and there is excess electricity from renewable energy sources, then electricity may be diverted to the energy storage device 1108 to charge the device (e.g., energy storage unit, thermal storage unit) (measures the charge/capacity of the device). If there is not excess electricity from the renewable energy sources 1104, then the control system 1112 may communicate with the energy storage device 1108 to discharge heat/steam 1114 to meet the facility steam demand in combination with the heat pump 1102.

If the energy storage device is fully charged, and there is still excess electricity, then electricity would be diverted to the grid 1106.

Having the energy arbitrage system 1110 include renewable energy sources 1104 that are connected to the electrical grid 1106 enables the system to use net metering, which is an electric grid billing mechanism where a user is charged for the difference of the cost of energy pulled from the grid (consumed) and the cost of energy sent to the grid (generated).

Figure 12:
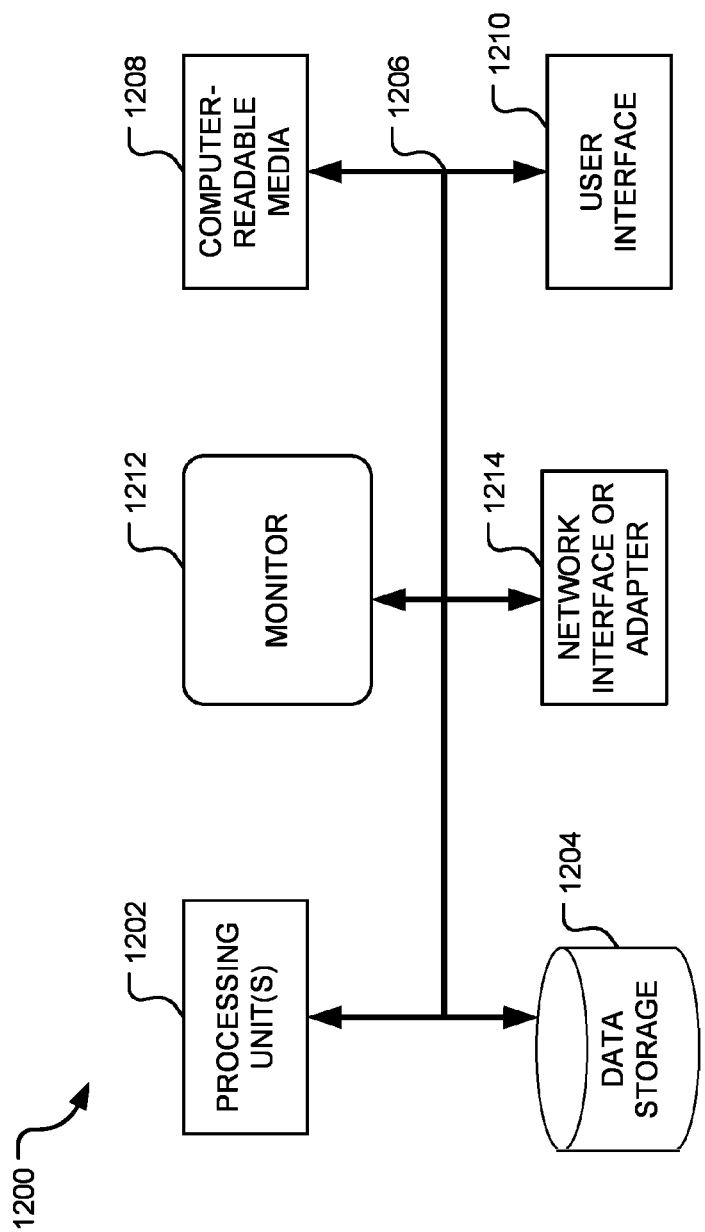
FIG. 12 is an exemplary diagram of a computing device capable of operating as a control system in the energy arbitrage system.

The following is a description of an exemplary computer 1200 that is part of or useable with the energy arbitrage system 1110 described herein. FIG. 12 illustrates an example of a suitable computing and networking environment 1200 that may be used to implement various aspects of the present disclosure described herein, such as the control system 1112 of FIG. 11. As illustrated in FIG. 12, the computing and networking environment 1200 includes a general purpose computing device 1200, although it is contemplated that the networking environment 1200 may include other computing systems, such as smart phones, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 1200 may include various hardware components, such as a processing unit 1202, a data storage 1204 (e.g., a system memory), and a system bus 1206 that couples various system components of the computer 1200 to the processing unit 1202. The system bus 1206 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1200 may further include a variety of computer-readable media 1208 that includes removable/non-removable media and volatile/nonvolatile media, but excludes transitory propagated signals. Computer-readable media 1208 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 1200. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 1204 includes computer storage media in the form of volatile/nonvolatile memory such as read only memory (ROM) and random access memory (RAM). A basic input/output system (BIOS), containing the basic routines that help to transfer information between elements within the computer 1200 (e.g., during start-up), is typically stored in ROM. RAM typically contains data and/or program modules that are immediately accessible to and/or presently being operated on by processing unit 1202. For example, in one embodiment, data storage 1204 holds an operating system, application programs, and other program modules and program data.

Data storage 1204 may also include other removable/non-removable, volatile/nonvolatile computer storage media. For example, data storage 1204 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 12, provide storage of computer-readable instructions, data structures, program modules and other data for the computer 1200.

A user may enter commands and information through a user interface 1210 or other input devices such as a tablet, electronic digitizer, a microphone, keyboard, and/or pointing device, commonly referred to as mouse, trackball or touch pad. The commands and information may be for setting up the lighting and/or watering schedules, including the specific parameters of each. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 1202 through a user interface 1210 that is coupled to the system bus 1206, but may be connected by other interface and bus structures, such as a parallel port, game port or a universal serial bus (USB). A monitor 1212 or other type of display device is also connected to the system bus 1206 via an interface, such as a video interface. The monitor 1212 may also be integrated with a touch-screen panel or the like.

When the computer 1200 is operating as a control system 1112, there may be various inputs and outputs associated with the energy arbitrage system 1100 of FIG. 11. For instance, the computer 1200 may include various inputs associated with the facility steam requirements, steam outputs from the boiler 1110, steam outputs from the heat pump cycles 1102, and steam outputs from the thermal storage units 1108. Additional inputs may include electricity production from the renewable energy source 1104, and the outflow from the renewable energy source including to the grid 1106, to the heat pump 1102, and to the thermal storage units 1108. Additional inputs can also include the electricity requirements of the heat pump system 1102 and the amount of electricity being supplied from the grid 1106. The computer 1200 may be in electrical communication with each of the heat pump system 1102, renewable energy source 1104, and/or the thermal storage units 1108 so the computer 1200 can actuate a component of the system 1100 to operate based on the various inputs received. In this way, the communication with the various systems can also be outputs so the computer 1200 can control the operation thereof.

The computer 1200 may operate in a networked or cloud-computing environment using logical connections of a network interface or adapter 1214 to one or more remote devices, such as a remote computer. The remote computer may be a personal computer, a server, a router, a network PC, a peer device or other common network node, and typically includes many or all of the elements described above relative to the computer 1200. The logical connections depicted in FIG. 12 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1200 may be connected to a public and/or private network through the network interface or adapter 1214. In such embodiments, a modem or other means for establishing communications over the network is connected to the system bus 1206 via the network interface, the adapter 1214, or other appropriate mechanism. A wireless networking component including an interface and antenna may be coupled through a suitable device such as an access point or peer computer to a network. In a networked environment, program modules depicted relative to the computer 1200, or portions thereof, may be stored in the remote memory storage device.

The foregoing merely illustrates the principles of the present disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the present disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the present disclosure.

What is claimed is:

1. A method for generating steam, said method comprising:
   (a) providing two or more heat pump cycles comprising a bottom heat pump cycle and a top heat pump cycle coupled via at least one intermediate heat exchanger;
   (b) circulating a first working fluid in said bottom heat pump cycle to absorb heat from an ambient air source;
   (c) using a first centrifugal compressor stage in said bottom heat pump cycle and a second centrifugal compressor stage in said bottom heat pump cycle in series to increase a pressure of said first working fluid;
   (d) circulating a second working fluid in said at least one intermediate heat exchanger to transfer said heat from said first working fluid to said second working fluid;
   (e) circulating said first working fluid in a first economizer, thereby
   splitting said first working fluid into a first primary fluid stream and a first secondary fluid stream;
   expanding said first secondary fluid stream of said first working fluid to a lower pressure via a first expansion valve in said bottom heat pump cycle, and absorbing heat in said first secondary fluid stream of said first working fluid; and
   rejecting heat from said first primary fluid stream of said first working fluid to said first secondary fluid stream of said first working fluid;
   (f) cooling said second working fluid in a first location and heating said second working fluid in a second location by rejecting heat from said first location and absorbing heat in said second location in said top heat pump cycle;
   (g) using a first centrifugal compressor stage in said top heat pump cycle and a second centrifugal compressor stage in said top heat pump cycle in series to increase a pressure of said second working fluid and to compress said second working fluid;

(h) circulating said second working fluid in said top heat pump cycle to transfer said heat from said second working fluid to a feed stream comprising water, thereby generating said steam at a target steam saturation temperature of at least 120 degrees Celsius, wherein said transfer of said heat from said second working fluid to said feed stream occurs in a steam generator, and wherein a pressure of said feed stream in said steam generator is greater than or equal to a pressure of said steam at said target steam saturation temperature; and (i) circulating said second working fluid in a second economizer, thereby splitting said second working fluid into a second primary fluid stream and a second secondary fluid stream;

expanding said second secondary fluid stream of said second working fluid to a lower pressure via a first expansion valve in said top heat pump cycle, and absorbing heat in said second secondary fluid stream of said second working fluid;

rejecting heat from said second primary fluid stream of said second working fluid to said second secondary fluid stream of said second working fluid; and directing said second secondary fluid stream of said second working fluid to an inlet of said second centrifugal compressor stage in said top heat pump cycle.

2. The method of claim 1, wherein step (e) further comprises directing said first secondary fluid stream of said first working fluid to an inlet of said second compressor stage in said bottom heat pump cycle.

3. The method of claim 1, wherein a coefficient of performance (COP) of said two or more heat pump cycles is greater than two.

4. The method of claim 1, wherein an efficiency of at least one of said first centrifugal compressor stage in said bottom heat pump cycle or said first centrifugal compressor stage in said top heat pump cycle is greater than or equal to 80%.

5. The method of claim 1, wherein a specific speed ($N_S$) versus a specific diameter ($D_S$) of at least one of said first centrifugal compressor stage in said bottom heat pump cycle, said second centrifugal compressor stage in said bottom heat pump cycle, said first centrifugal compressor stage in said top heat pump cycle, or said second centrifugal compressor stage in said top heat pump cycle results in an efficiency greater than or equal to 80%.

6. The method of claim 1, wherein said target steam saturation temperature of said steam is between 120 degrees Celsius and 150 degrees Celsius.

7. The method of claim 1, wherein said target steam saturation temperature of said steam is greater than or equal to 150 degrees Celsius.

8. The method of claim 1, wherein a temperature of said ambient air source is 20 degrees Celsius.

9. The method of claim 1, wherein a temperature difference or lift between said ambient air source and said steam is 100 degrees Celsius to 150 degrees Celsius.

10. The method of claim 1, wherein (c) increases a temperature of said first working fluid by at least 30 degrees Celsius.

11. The method of claim 1, wherein (g) increases a temperature of said second working fluid by at least 30 degrees Celsius.

12. The method of claim 1, wherein compressing said second working fluid using said second centrifugal compressor stage in said top heat pump cycle increases a temperature of said second working fluid by at least 40 degrees Celsius.

13. The method of claim 1, wherein (i) at least one of said first centrifugal compressor stage in said bottom heat pump cycle or said first centrifugal compressor stage in said top heat pump cycle, and (ii) at least one of said second centrifugal compressor stage in said bottom heat pump cycle or said second centrifugal compressor stage in said top heat pump cycle, have a same workload.

14. The method of claim 1, wherein a pressure ratio of at least one of said first centrifugal compressor stage in said bottom heat pump cycle or said first centrifugal compressor stage in said top heat pump cycle is at least 20% less than a pressure ratio of at least one of said second centrifugal compressor stage in said bottom heat pump cycle or said second centrifugal compressor stage in said top heat pump cycle.

15. The method of claim 1, wherein an inlet volumetric flow rate of at least one of said first centrifugal compressor stage in said bottom heat pump cycle or said first centrifugal compressor stage in said top heat pump cycle is at most 110% more than an inlet volumetric flow rate of at least one of said second centrifugal compressor stage in said bottom heat pump cycle or said second centrifugal compressor stage in said top heat pump cycle.

16. The method of claim 1, wherein an isentropic efficiency of at least one of said first centrifugal compressor stage in said bottom heat pump cycle or said first centrifugal compressor stage in said top heat pump cycle is substantially same as an isentropic efficiency of at least one of said second centrifugal compressor stage in said bottom heat pump cycle or said second centrifugal compressor stage in said top heat pump cycle.

17. The method of claim 1, further comprising:
expanding said first working fluid to a lower pressure using a second expansion valve in said bottom heat pump cycle.

18. The method of claim 1, further comprising:
expanding said second working fluid to a lower pressure using a second expansion valve in said top heat pump cycle.

19. The method of claim 1, further comprising:
compressing said steam using a steam compressor.

20. The method of claim 1, further comprising:
heating said first working fluid by rejecting and using heat from another location in said bottom heat pump cycle.

21. The method of claim 1, wherein at least one of said first working fluid or said second working fluid comprises a fluorocarbon, a hydrofluoroolefin, a hydrofluoroether, a hydrocarbon, carbon dioxide, ammonia, or water.

22. The method of claim 21, wherein at least one of said first working fluid or said second working fluid comprises said hydrofluoroolefin or said hydrofluoroether.

* * * * *